US012645355B2

(12) United States Patent
Shao

(10) Patent No.: US 12,645,355 B2
(45) Date of Patent: Jun. 2, 2026

(54) INTERACTION METHOD AND APPARATUS, ELECTRONIC DEVICE, AND READABLE STORAGE MEDIUM FOR PLAYING A TARGET EFFECT ACCORDING TO THE FIRST ACTION INFORMATION OF THE FIRST OBJECT ACTING ON THE SECOND OBJECT

(71) Applicant: Beijing Zitiao Network Technology Co., Ltd., Beijing (CN)

(72) Inventor: Ziyu Shao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/614,313

(22) Filed: Mar. 22, 2024

(65) Prior Publication Data

US 2024/0231602 A1 Jul. 11, 2024

Related U.S. Application Data

(63) Continuation of application No. PCT/CN2022/115510, filed on Aug. 29, 2022.

(30) Foreign Application Priority Data

Sep. 24, 2021 (CN) .......................... 202111124153.3

(51) Int. Cl.
*G06F 3/0488* (2022.01)
*G06F 3/04812* (2022.01)
(52) U.S. Cl.
CPC ........ *G06F 3/0488* (2013.01); *G06F 3/04812* (2013.01)

(58) Field of Classification Search
CPC .................. G06F 3/048–04897; H04N 21/431
See application file for complete search history.

(56) References Cited

U.S. PATENT DOCUMENTS 10,897,637 B1 * 1/2021 Pham ............... H04N 21/23406
2006/0058103 A1 * 3/2006 Danieli ................... A63F 13/87
463/42

(Continued)

FOREIGN PATENT DOCUMENTS

CN 107172488 A 9/2017
CN 107241636 A 10/2017

(Continued)

OTHER PUBLICATIONS

International Search Report and Written Opinion for PCT/CN2022/115510, mailed Nov. 2, 2022, 16 pages.

(Continued)

*Primary Examiner* — Nicholas Klicos
(74) *Attorney, Agent, or Firm* — Astute IP Law Group

(57) ABSTRACT

An interaction method and apparatus, an electronic device, and a readable storage medium are provided. The method includes: in a process of playing a multimedia content, in response to a first operation, displaying a first control, a first object and a second object; in response to a second operation for the first control, controlling the first object to act on the second object, and displaying a panel, in which the panel is configured to display first action information of the first object acting on the second object.

20 Claims, 10 Drawing Sheets

(56) References Cited

U.S. PATENT DOCUMENTS

| | | | | |
|---|---|---|---|---|
| 2008/0146342 | A1* | 6/2008 | Harvey | A63F 13/10 |
| | | | | 463/42 |
| 2010/0273553 | A1* | 10/2010 | Zalewski | H04N 21/235 |
| | | | | 463/31 |
| 2011/0077083 | A1* | 3/2011 | Ahn | A63F 13/2145 |
| | | | | 345/173 |
| 2014/0106858 | A1* | 4/2014 | Constable | A63F 13/88 |
| | | | | 463/25 |
| 2014/0357339 | A1* | 12/2014 | Urushihara | G07F 17/329 |
| | | | | 463/17 |
| 2016/0171835 | A1* | 6/2016 | Washington | G07F 17/3223 |
| | | | | 463/25 |
| 2018/0160158 | A1* | 6/2018 | Liu | H04N 21/44218 |
| 2018/0214777 | A1* | 8/2018 | Hingorani | A63F 13/5255 |
| 2019/0366213 | A1* | 12/2019 | Zhou | A63F 13/533 |
| 2022/0035515 | A1* | 2/2022 | Wan | A63F 13/5372 |
| 2022/0168642 | A1* | 6/2022 | Liu | A63F 13/55 |

FOREIGN PATENT DOCUMENTS

| | | | |
|---|---|---|---|
| CN | 107592575 | A | 1/2018 |
| CN | 108989898 | A | 12/2018 |
| CN | 111225226 | A | 6/2020 |
| CN | 111541928 | A | 8/2020 |
| CN | 111641841 | A | 9/2020 |
| CN | 111641843 | A | 9/2020 |
| CN | 111757135 | A | 10/2020 |
| WO | 2021/109650 | A1 | 6/2021 |

OTHER PUBLICATIONS

Extended European Search Report for European Patent Application No. 22871760.9, mailed on Nov. 25, 2024, 8 pages.
Office Action for Chinese Patent Application No. 202111124153.3, mailed on Mar. 21, 2025, 12 pages.

* cited by examiner

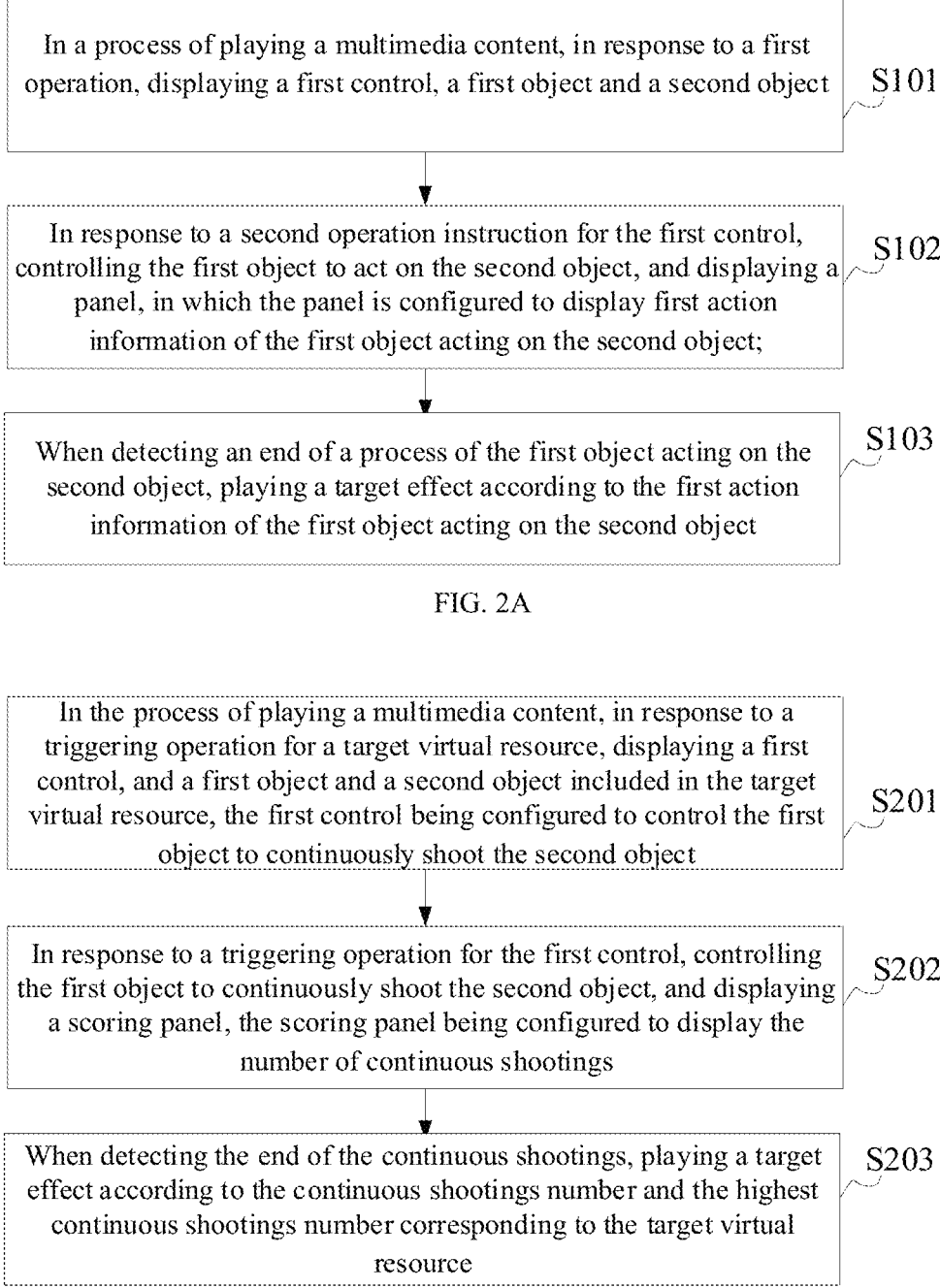

In a process of playing a multimedia content, in response to a first operation, displaying a first control, a first object and a second object    S101

In response to a second operation instruction for the first control, controlling the first object to act on the second object, and displaying a panel, in which the panel is configured to display first action information of the first object acting on the second object;    S102

When detecting an end of a process of the first object acting on the second object, playing a target effect according to the first action information of the first object acting on the second object    S103

FIG. 2A

In the process of playing a multimedia content, in response to a triggering operation for a target virtual resource, displaying a first control, and a first object and a second object included in the target virtual resource, the first control being configured to control the first object to continuously shoot the second object    S201

In response to a triggering operation for the first control, controlling the first object to continuously shoot the second object, and displaying a scoring panel, the scoring panel being configured to display the number of continuous shootings    S202

When detecting the end of the continuous shootings, playing a target effect according to the continuous shootings number and the highest continuous shootings number corresponding to the target virtual resource    S203

FIG. 2B

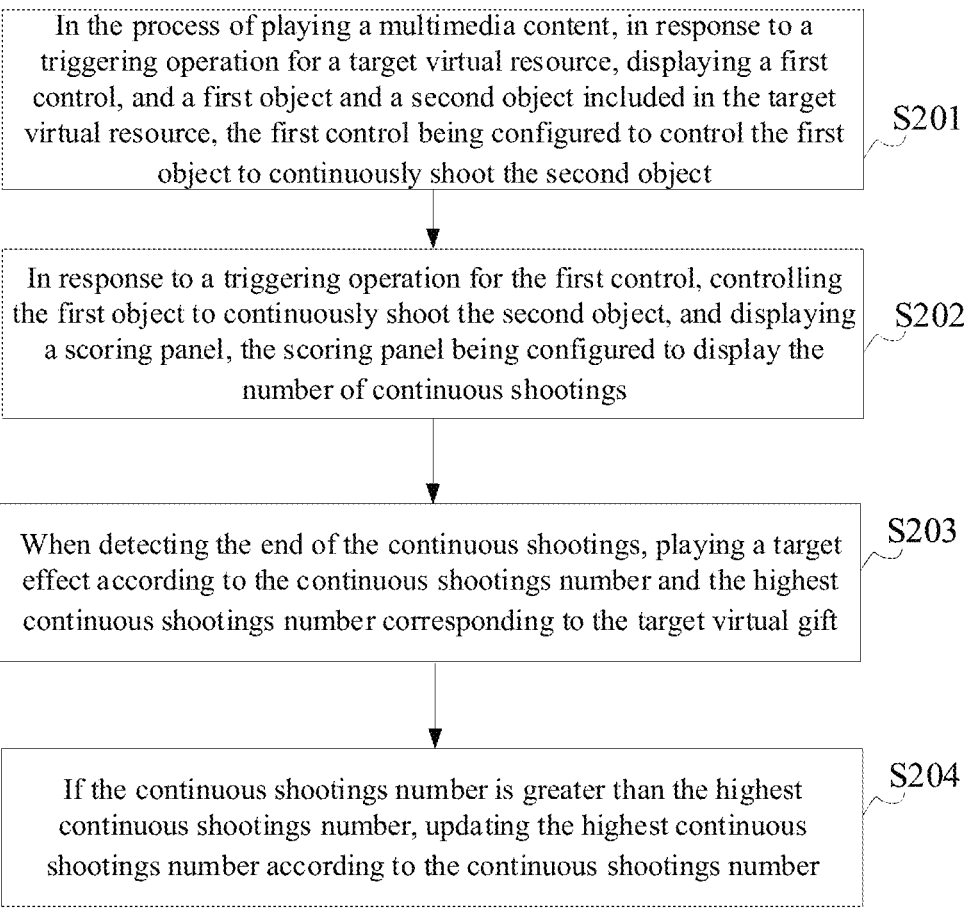

In the process of playing a multimedia content, in response to a triggering operation for a target virtual resource, displaying a first control, and a first object and a second object included in the target virtual resource, the first control being configured to control the first object to continuously shoot the second object          S201

In response to a triggering operation for the first control, controlling the first object to continuously shoot the second object, and displaying a scoring panel, the scoring panel being configured to display the number of continuous shootings          S202

When detecting the end of the continuous shootings, playing a target effect according to the continuous shootings number and the highest continuous shootings number corresponding to the target virtual gift          S203

If the continuous shootings number is greater than the highest continuous shootings number, updating the highest continuous shootings number according to the continuous shootings number          S204

FIG. 3

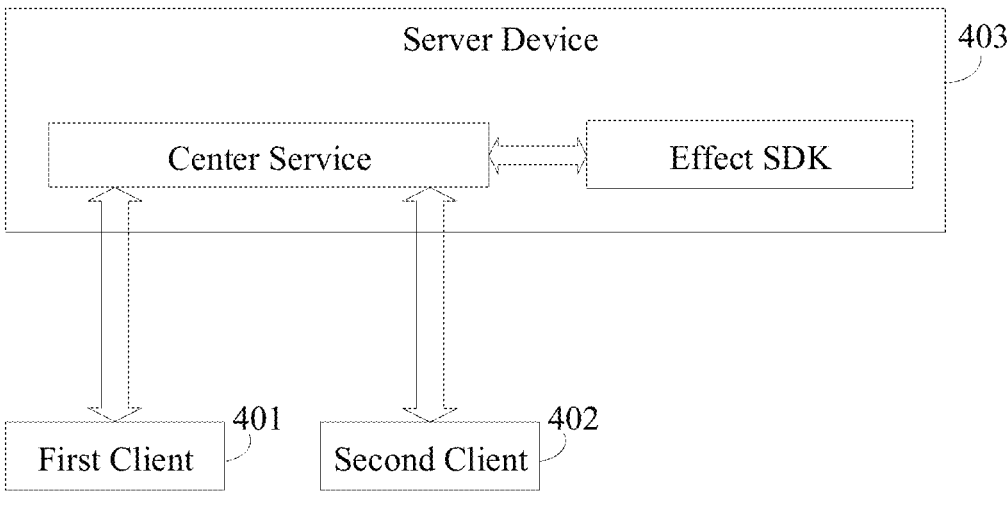

Server Device          403

Center Service          Effect SDK

First Client          401          Second Client          402

INTERACTION METHOD AND APPARATUS, ELECTRONIC DEVICE, AND READABLE STORAGE MEDIUM FOR PLAYING A TARGET EFFECT ACCORDING TO THE FIRST ACTION INFORMATION OF THE FIRST OBJECT ACTING ON THE SECOND OBJECT

CROSS-REFERENCE TO RELATED APPLICATIONS

This application is a continuation of International Application No. PCT/CN2022/115510 filed on Aug. 29, 2022, which claims the priority to and benefits of Chinese patent application Ser. No. 20/211,1124153.3, filed on Sep. 24, 2021. All the aforementioned patent applications are hereby incorporated by reference in their entireties.

TECHNICAL FIELD

The present disclosure relates to the technical field of computer, and in particular to an interaction method, an interaction apparatus, an electronic device, a readable storage medium, and a program product.

BACKGROUND

With the continuous development of the Internet technology, the way by which the user acquires a multimedia content is also constantly changed. For example, the user may enjoy the rich multimedia content such as a movie, a television drama, a song performance, and a variety show through the live broadcasting channel provided by an application program. When the multimedia content is displayed in the application program, the user may also participate in the multimedia content and interact with an object in the multimedia content, as to increase interestingness. For example, the user may give a special effect resource to the object in the multimedia content.

At present, the way by which the user gives the special effect resource is relatively single, which affects the user's enthusiasm for using the special effect resource. Therefore, how to make the interaction between the user and the object in the multimedia content more diversified is an urgent problem to be solved currently.

SUMMARY

In order to solve the above technical problem or at least partially solve the above technical problem, the present disclosure provides an interaction method, an interaction apparatus, an electronic device, a readable storage medium, and a program product.

In a first aspect, the present disclosure provides an interaction method, which includes: in the process of playing a multimedia content, in response to a triggering operation for a target virtual resource, displaying a first control, and a first object and a second object included in the target virtual resource, the first control being configured to control the first object to continuously shoot the second object; in response to a triggering operation for the first control, controlling the first object to continuously shoot the second object, and displaying a scoring panel, the scoring panel being configured to display the number of continuous shootings; and when detecting the end of the continuous shootings, playing a target effect according to the continuous shootings number and the highest continuous shootings number corresponding to the target virtual resource.

In a possible implementation, playing the target effect according to the continuous shootings number and the highest continuous shootings number corresponding to the target virtual resource, includes: if the continuous shootings number is greater than the highest continuous shootings number corresponding to the target virtual resource, playing a first effect; and if the continuous shootings number is less than or equal to the highest continuous shootings number corresponding to the target virtual resource, playing a second effect; the target effect is the first effect or the second effect.

In a possible implementation, the method further includes: if the continuous shootings number is greater than the highest continuous shootings number corresponding to the target virtual resource, displaying associated information of a user operating the target virtual resource.

In a possible implementation, the method further includes: if the continuous shootings number is greater than the highest continuous shootings number, updating the highest continuous shootings number according to the continuous shootings number.

In a possible implementation, the method further includes: in the process of continuously shooting the second object by the first object, dynamically updating a display style of the scoring panel according to the increase in the continuous shootings number.

In a possible implementation, displaying the first control and the first object and the second object included in the target virtual resource includes: if a playing picture of the multimedia content includes a preset target object, displaying the second object according to a position of the preset target object in the playing picture.

In a possible implementation, displaying the first control and the first object and the second object included in the target virtual resource includes: if the playing picture of the multimedia content does not include a preset target object, displaying the second object in a first preset position in the playing picture of the multimedia content.

In a possible implementation, the method further includes: sending associated information of the target virtual resource to a server device to cause the server device to display the target virtual resource on a client associated with the multimedia content, according to the associated information of the target virtual resource.

In a second aspect, the present disclosure provides an interaction method, which includes: in a process of playing a multimedia content, in response to a first operation, displaying a first control, a first object and a second object; in response to a second operation for the first control, controlling the first object to act on the second object, and displaying a panel, the panel is configured to display first action information of the first object acting on the second object; and when detecting an end of a process of the first object acting on the second object, playing a target effect according to the first action information of the first object acting on the second object.

In a possible implementation, the controlling the first object to act on the second object includes at least one of: (i) controlling the first object to directly act on the second object; (ii) controlling an associated object of the first object to act on the second object.

In a possible implementation, the first operation is a triggering operation for an identifier corresponding to a target virtual resource, and the target virtual resource includes the first object and the second object; the playing the target effect according to the first action information of the first object acting on the second object, includes: playing the target effect according to the first action information of the first object acting on the second object, and second action information corresponding to the target virtual resource; the first action information includes a number of actions of the first object acting on the second object, and the second action information includes a maximum number of actions corresponding to the target virtual resource.

In a possible implementation, the playing the target effect according to the first action information of the first object acting on the second object, and the second action information corresponding to the target virtual resource, includes: if the number of actions of the first object acting on the second object is greater than the maximum number of actions corresponding to the target virtual resource, playing a first effect; and if the number of actions of the first object acting on the second object is less than or equal to the maximum number of actions corresponding to the target virtual resource, playing a second effect, the target effect is the first effect or the second effect.

In a possible implementation, the method further includes: if the number of actions of the first object acting on the second object is greater than the maximum number of actions corresponding to the target virtual resource, displaying associated information of the target virtual resource.

In a possible implementation, the method further includes: if the number of actions of the first object acting on the second object is greater than the maximum number of actions corresponding to the target virtual resource, updating the maximum number of actions corresponding to the target virtual resource according to the number of actions of the first object acting on the second object.

In a possible implementation, the target virtual resource includes a target virtual gift; the controlling the first object to act on the second object includes controlling the first object to shoot the second object; and the first action information is a number of shots of the first object shooting the second object, and the second action information is a maximum number of shots corresponding to the target virtual gift.

In a possible implementation, the method further includes: in the process of the first object acting on the second object, dynamically updating a display style of the panel according to an increase of the number of actions of the first object acting on the second object.

In a possible implementation, the detecting the end of the process of the first object acting on the second object includes not receiving the second operation again for the first control within a preset duration after receiving the second operation for the first control; or the target virtual resource is set with a usage duration, and the detecting the end of the process of the first object acting on the second object includes reaching the usage duration.

In a third aspect, the present disclosure provides an interaction apparatus, which includes: a receiving module configured to receive a triggering operation for a target virtual resource; and a display module configured to, in the process of playing a multimedia content, in response to the triggering operation for the target virtual resource, display a first control, and a first object and a second object included in the target virtual resource, the first control being used to control the first object to continuously shoot the second object. The receiving module is further configured to receive a triggering operation for the first control; and the display module is further configured to: in response to the triggering operation for the first control, display the first object continuously shooting the second object, and display a scoring panel, and the scoring panel is configured to display a number of continuous shootings; and when detecting the end of the continuous shootings, play a target effect according to the continuous shootings number and the highest continuous shootings number corresponding to the target virtual resource.

In a fourth aspect, the present disclosure provides an interaction apparatus, which includes: a receiving module, configured to receive a first operation for a target virtual resource; and a display module, configured to, in a process of playing a multimedia content, in response to the first operation, display a first control, and a first object and a second object included in the target virtual resource; the receiving module is further configured to receive a second operation for the first control; and the display module is further configured to: in response to the second operation for the first control, control the first object to act on the second object, and display a panel, the panel is configured to display first action information of the first object acting on the second object; and when detecting an end of a process of the first object acting on the second object, play a target effect according to the first action information of the first object acting on the second object.

In a fifth aspect, the present disclosure provides an electronic device, which includes a memory and a processor. The memory is configured to store computer program instructions; and the processor is configured to execute the computer program instructions to implement the interaction method according to any one of the first aspects.

In a sixth aspect, the present disclosure provides a readable storage medium, which includes computer program instructions, the computer program instructions are executed by at least one processor of an electronic device, causing the electronic device to implement the interaction method according to any one of the first aspects.

In a seventh aspect, the present disclosure provides a computer program product, when the computer program product is executed by a computer, causes the computer to implement the interaction method according to any one of the first aspects.

In an eighth aspect, the present disclosure provides a chip system, which includes a processor; when the processor executes computer instructions stored in a memory, causing the electronic device to implement the interaction method according to any one of the first aspects.

BRIEF DESCRIPTION OF DRAWINGS

The drawings herein are incorporated into and form a part of the specification, illustrate embodiments consistent with the present disclosure, and are used in conjunction with the specification to explain the principles of the present disclosure.

To more clearly illustrate the embodiments of the present disclosure, the drawings required to be used for the embodiments are briefly described in the following, obviously, for those skilled in the art, other drawings can be acquired based on these drawings without any inventive work.

FIG. 2A is a flowchart of an interaction method provided by an embodiment of the present disclosure;

FIG. 2B is a flowchart of an interaction method provided by an embodiment of the present disclosure;

FIG. 3 is a flowchart of another interaction method provided by an embodiment of the present disclosure;

FIG. 4 is a schematic diagram of an application scene of the interaction method provided by an embodiment of the present disclosure;

DETAILED DESCRIPTION

Figure 1A:
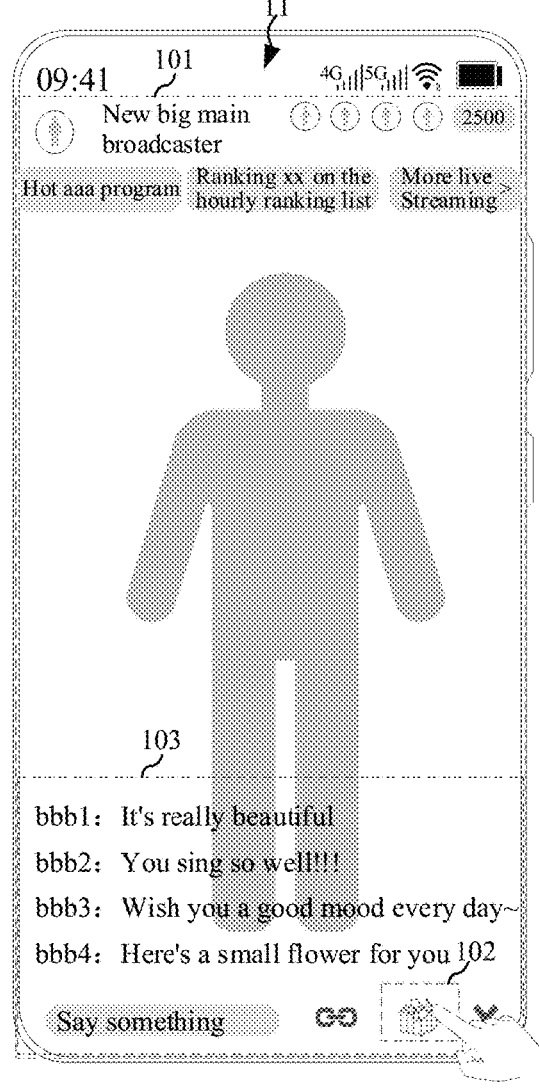
FIG. 1A-FIG. 1M are schematic diagrams of a human-computer interaction interface provided by an embodiment of the present disclosure.

In order to understand the above objects, features and advantages of the present disclosure more clearly, the solutions of the present disclosure are further described below. It should be noted that embodiments and features in the embodiments of the present disclosure may be combined with each other without conflict.

Many specific details are set forth in the following description to facilitate a full understanding of the present disclosure, but the present disclosure may also be implemented in other ways different from those described herein; obviously, the embodiments in the specification are only a part but not all of the embodiments of the present disclosure.

Exemplarily, the present disclosure provides an interaction method, an interaction apparatus, an electronic device, a readable storage medium, and a program product. In the process of playing a multimedia content, based on a triggering operation for a target virtual resource, a first control, and a first object and a second object included in the target virtual resource are displayed, the first control is configured to control the first object to continuously shoot the second object; in response to a triggering operation for the first control, the first object is controlled to continuously shoot the second object, and a scoring panel is displayed, the scoring panel is configured to display the number of continuous shootings; and when detecting the end of the continuous shootings, a target effect is played according to the continuous shootings number and the highest continuous shootings number corresponding to the target virtual resource. In the process of playing the multimedia content, the present disclosure compares the highest continuous shootings number of the target virtual resource with the current number of the continuous shootings, and thereby the corresponding effect is played. By transparently transmitting a competition result of a user using the target virtual resource, a healthy competition between the user and a user with the highest continuous shootings number is established, thereby the diversity of interaction between the user and the object in the multimedia content is enhanced, and it is beneficial to increase the users' enthusiasm for using the target virtual resource.

The multimedia content may include a video program, a video performance, a real-time recorded content, a pre-recorded content and the like, and it is not limited in the present disclosure.

The object in the multimedia content, for example, when the multimedia content is a dance performance, the object may include one or more dance performers; when the multimedia content is a cross talk performance, the object may include one or more cross talk performers; and when the multimedia content is a television drama or a movie, the object in the multimedia content may include an actor.

The interaction method of the present disclosure is executed by an electronic device. The electronic device may be a tablet computer, a mobile phone (such as a foldable screen mobile phone, and a large screen mobile phone), a wearable device, a vehicle device, an augmented reality (AR)/virtual reality (VR) device, a notebook computer, an ultra-mobile personal computer (UMPC), a netbook, a personal digital assistant (PDA), a smart television, a smart screen, a high-definition television, a 4K television, a smart speaker, and an internet of things (IOT) device such as a smart projector, and the specific type of the electronic device is not limited in the present disclosure.

The type of an operating system for the electronic device is not limited in the present disclosure. For example, an Android system, a Linux system, a Windows system, an IOS system, and the like.

Based on the above description, an embodiment of the present disclosure takes the electronic device as an example, and combines drawings and application scenes, to provide a detailed description of the interaction method provided by the present disclosure.

In combination with FIG. 1A-FIG. 1M, the realization process of the interaction method in the present disclosure is introduced. For ease of description, the mobile phone is used as the electronic device, a short video social contact application 1 (APP1 for short) is installed in the mobile phone, and a real-time recorded singing performance is played in APP1, the real-time recorded singing performance is the multimedia content.

FIG. 1A-FIG. 1M are schematic diagrams of a human-computer interaction interface provided by embodiments of the present disclosure.

When APP1 receives the triggering operation for entering the multimedia content, APP1 may exemplarily display the user interface 11 shown in FIG. 1A on the mobile phone, the user interface 11 is used to display the multimedia content.

In FIG. 1A, the user interface 11 includes: an area 101 and a first inlet 102.

The area 101 is used to display a playing picture of the multimedia content, so that the user may view the multimedia content. Parameters such as a shape and an area position of the area 101 are not limited in the present disclosure.

In addition, the area 101 may also be used to display contents such as an attention button of an account associated with the multimedia content played currently, the number of views of the multimedia content played currently, and a title of the multimedia content played currently. In addition, the area 101 may also be used to display a control related to the multimedia content played currently. For example, a button for closing the multimedia content played currently, a button for sharing the multimedia content played currently, and a button for projecting the multimedia content played currently to a screen.

The above control related to the multimedia content played currently may be set in a top area of the area 101, or may be set in a bottom area of the area 101. If there are a large number of the controls related to the multimedia content, some of the controls may be set at the top of the area 101, and some may be set at the bottom of the area 101. Certainly, it may also be set at one or two sides of the area 101. In practical applications, the positions of these controls may be flexibly set according to needs, and the display style, size, and other parameters of the controls related to the multimedia content played currently are not limited in the present disclosure.

The first inlet 102 is used to enter a virtual resource display interface, and the virtual resource display interface is used to display one or more virtual resources provided by APP1. The first inlet 102 may be displayed in the form of an icon, a text, a symbol, a picture and the like, or displayed in the form of a combination of various forms. In addition, display parameters such as color, size, position, and dynamic effect of the first inlet 102 are not limited in the present disclosure. For example, as shown in FIG. 1A, the first inlet 102 may be realized by using a "resource box" shaped icon.

In addition, the present disclosure does not limit parameters such as whether there is overlap between the area 101 and the first inlet 102. For example, in the user interface 11 shown in FIG. 1A, the area 101 may include an entire mobile phone screen, and the first inlet 102 may be located inside the area 101 and suspended in an upper layer of the area 101.

In some cases, the user interface 11 may also include: an area 103, the area 103 is used to display a comment interface corresponding to the multimedia content, and the comment interface is mainly used to display comment information for the multimedia content played currently. The present disclosure does not limit the way by which the comment information is displayed on the comment interface. For example, a preset number of the comment information may be rolling-displayed in the area 103 according to a sequential order of a publication time of the comment information, the latest comment information may be displayed at the bottom of the area 103, and the earliest comment information may be displayed at the top of the area 103. When there is new comment information, it may make the comment information at the top of the area 103 disappear and display the latest comment information at the bottom of the area 103.

The present disclosure does not limit whether the user interface 11 displays the area 103. In some cases, the user interface 11 may also include a button for controlling display or closure of the area 102, based on a triggering operation (such as a clicking operation) for the button, the control of whether the area 103 (namely the comment interface) is displayed in the user interface is realized. It should be noted that a button for controlling display or closure of the area 103 is unshown in the user interface 11.

In some cases, when the area 103 is displayed in the user interface 11, the area 103 may be overlapped with the area 101, the area 103 may be suspended in the upper layer of the area 101, and the area 103 may be set to a semi-transparent state, as to avoid the comment information from blocking the playing picture of the multimedia content.

In addition, the present disclosure does not limit a positional relationship between the first inlet 102 and the area 103. For example, in the user interface 11 shown in FIG. 1A, the first inlet 102 is located inside the area 103, and the first inlet 102 is displayed on the upper layer of the area 103.

In practical applications, the first inlet 102 may also avoid any overlap with the area 103. For example, the first inlet 102 may also be set in other positions outside the area 103 and try not to block the playing picture of the multimedia content.

Figure 1B:
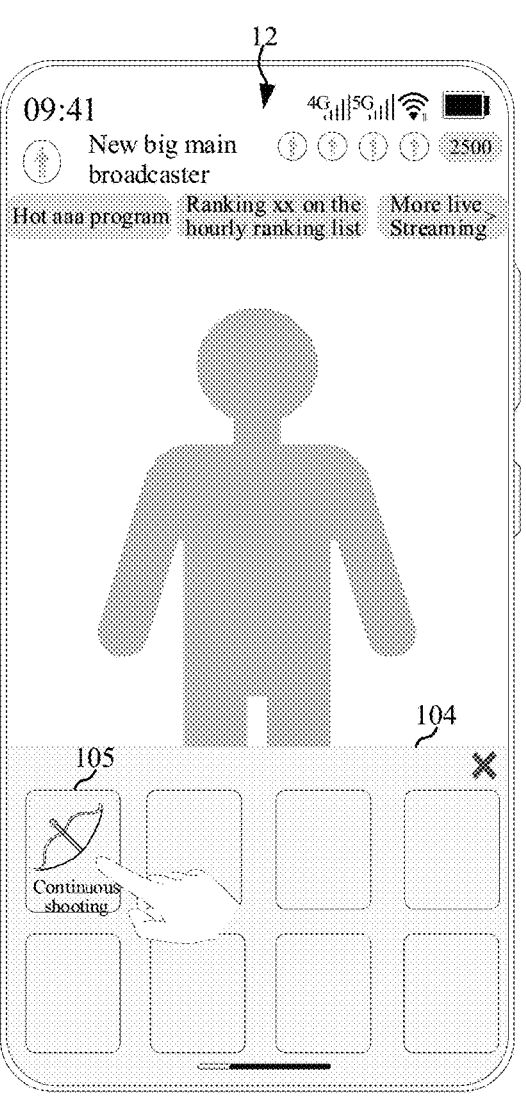

Based on the user interface 11 shown in FIG. 1A, APP1 receives a triggering operation (such as a clicking operation) for the first inlet 102, and APP1 may exemplarily display the user interface 12 shown in FIG. 1B on the mobile phone.

In FIG. 1B, the user interface 12 includes: an area 104, the area 104 is used to display a virtual resource, so that the user may view information about the virtual resource provided by APP1 and use the virtual resource. The area 104 may include an area 105 for displaying each virtual resource. The area 105 may display associated information about the corresponding virtual resource, for example, one or more of information such as a cover of the virtual resource, a name of the virtual resource, a cost of the virtual resource, whether the virtual resource is a newly launched resource, and an unlocking condition of the virtual resource.

The present disclosure does not limit the display mode of the area 105 corresponding to each virtual resource. In addition, parameters such as the area size, area shape, color and dynamic effect of the area 105 corresponding to the virtual resource are not limited.

Exemplarily, in the area 104, it is displayed in multi-row and multi-column alignment according to an order from left to right and from top to bottom, and each area 105 has the same size. For example, as shown in FIG. 1B, in the area 104, 4 virtual resources are displayed in each row, namely 4 areas 105 are displayed in each row, and two rows are displayed in the area 104, as to reduce the blocking of the virtual resources to the playing picture of the multimedia content. The user may view more virtual resources provided by APP1 by operations of sliding upwards and downwards or leftwards and rightwards.

In addition, a control related to the virtual resource, for example a sending control, may also be displayed in the area 105. In some embodiments, a default state of the control related to the virtual resource may be hidden display. Based on the triggering operation (such as clicking on any positions in the area 105, long-pressing any positions in the area 105, and the like) of the user, one or more controls related to the virtual resource may be displayed. For example, in the user interface 12 shown in FIG. 1B, the default state is used to hidden-display the control related to the virtual resource; in other embodiments, the default state of the control related to the virtual resources may also be a display state, it may be directly used by the user without any triggering operations; and the above two modes may be flexibly set according to needs, and it is not limited in the present disclosure.

Figure 1C:
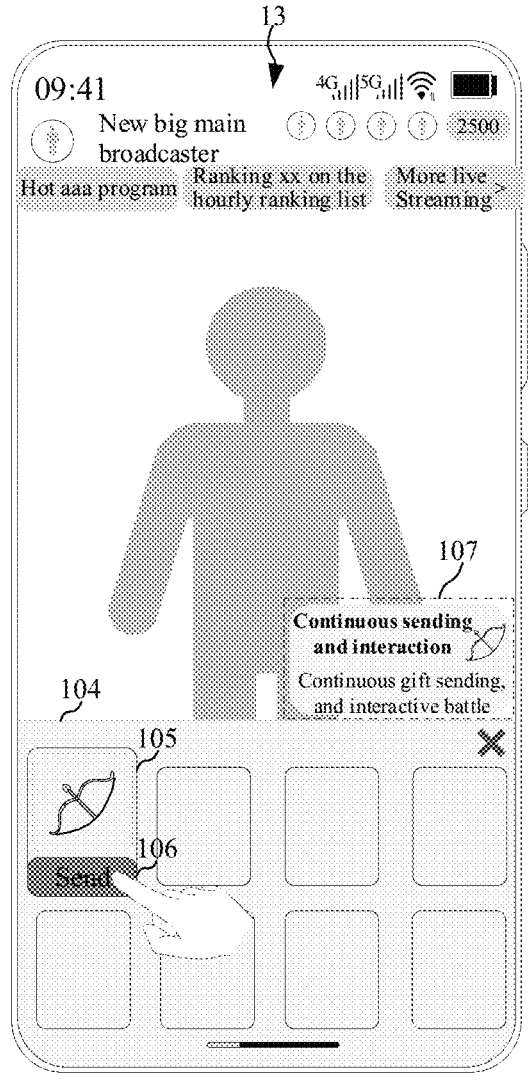

In response to the triggering operation (such as the clicking operation) for any positions in the area 105, APP1 may exemplarily display the user interface 13 shown in FIG. 1C on the mobile phone. As shown in FIG. 1C, in the user interface 13, a sending control 106 for sending the virtual resource to the object in the multimedia content may be displayed in the area 105.

The present disclosure does not limit the display mode of the target virtual resource selected by the user. For example, as shown in FIG. 1C, the target virtual resource selected by the user may be highlighting-displayed, and the area 105 corresponding to the target virtual resource may be slightly larger than the area sizes of other unselected virtual resources. Certainly, the target virtual resource selected by the user may also not be highlighting-displayed, namely, when all virtual resources are selected and unselected, the same display mode is used. It is not limited in the present disclosure. In this embodiment, highlighting display of the target virtual resource selected is taken as an example for illustration.

If the user does not unlock the permission for the target virtual resource, when APP1 receives the triggering operation (such as the clicking operation) for the sending control 106, APP1 may display an unlocking permission interface on the mobile phone. The user may unlock a usage permission for the corresponding target virtual resource by operating a related control in the unlocking permission interface. If the user unlocks the permission for the target virtual resource, APP1 may display all objects and corresponding operation controls included in the target virtual resource on the mobile phone.

It should be noted that if the virtual resource permission is unlocked by a mode of purchasing, the unlocking permission interface is a purchasing interface; and if the virtual resource permissions is unlocked by a mode of completing an interaction task, the unlocking permission interface is an interaction task interface. It should be noted that in the embodiment of the present disclosure, the realization mode of the user unlocking the virtual resource permission is not limited, and it may be realized in any ways. Therefore, it is not repeatedly described in detail in this embodiment.

In addition, when the user selects a virtual resource, APP1 may also display a related content of the virtual resource selected, so that the user may obtain more information related to the virtual resource selected, and it is beneficial for providing the user with the enthusiasm to use the virtual resource.

For example, referring to the embodiment shown in FIG. 1C, the user interface 13 further includes: an area 107 and displays the content related to the virtual resource selected by the user by the area 107. The related content of the virtual resource selected may be realized by one or more modes such as a text, a picture, and a symbol. For example, the related content of the virtual resource selected may include: a thumbnail of the cover of the target virtual resource, text information inviting the user to use the target virtual resource and the like.

The present disclosure does not limit parameters such as the area position, area size, area shape, color, text color, and text size of the area 107.

It is assumed that the target virtual resource that the user wants to give to the object in the multimedia content is a virtual resource located in the first row and first column of the area 104 shown in FIG. 1C, the target virtual resource is a continuous shooting resource, and the user unlocks the permission for the target virtual resource. The area 107 may display the thumbnail of the cover of the continuous shooting resource, as well as text contents of "continuous shooting resource interaction" and "continuous shooting resource, interaction confrontation", and different font sizes are used for these two parts of the text contents.

The area 107 may be set in a position close to a side of a mobile phone screen, as to avoid blocking the playing picture of the multimedia content as much as possible.

In addition, the area 107 may be set in a position close to the area 104, such as an upper left or upper right position of the area 104. For example, when the target virtual resource selected is located in a left half portion of the area 104, the area 107 may be displayed in the upper left position of the area 104; and when the target virtual resource selected is located in a right half portion of the area 104, the area 107 may be displayed in the upper right position of the area 104. In this way, the area 107 may approach the target virtual resource, so that the user may easily acquire information in the area 107. Certainly, the area 107 may also be set in other positions according to needs, and is not associated with the position of the area 104.

When APP1 receives the triggering operation (such as the clicking operation) for the sending control 106 in the area 105 corresponding to the target virtual resource, APP1 may exemplarily display various objects included in the target virtual resource on the mobile phone, and display the related control for controlling one or more objects included in the target virtual resource.

In the following text, it is illustrated by using the target virtual resource as the continuous shooting resource.

Figure 1D:
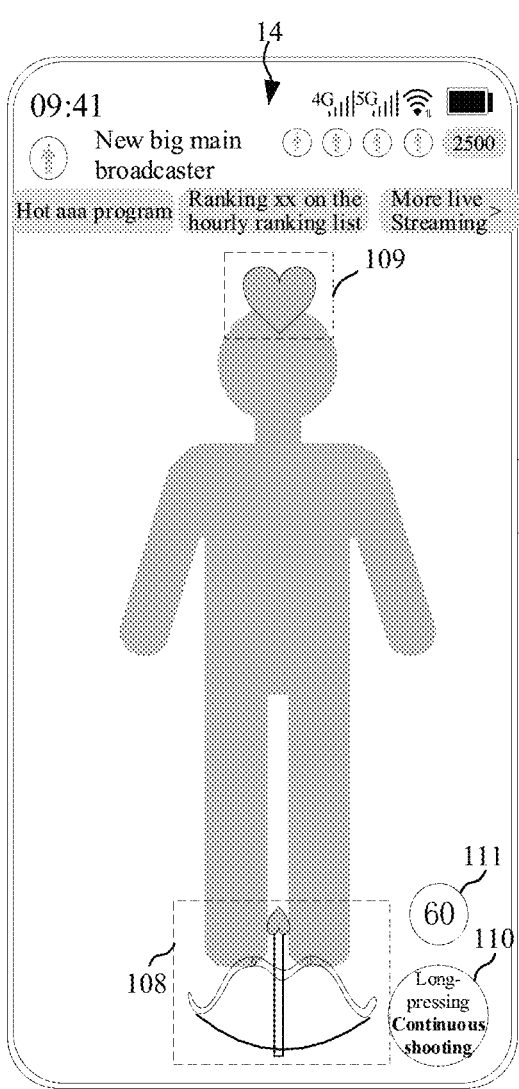

When APP1 receives the triggering operation (such as the clicking operation) for the sending control 106 in the area 105 according to the continuous shooting resource, APP1 may exemplarily display the user interface 14 shown in FIG. 1D on the mobile phone.

In FIG. 1D, the user interface 14 includes a first object 108 and a second object 109 included in the continuous shooting resource, as well as a first control 110 for controlling the first object to shoot or continuously shoot the second object.

It is assumed that the continuous shooting resource is realized in the form of "bow and arrow+target object", the first object 108 is the "bow and arrow", and the second object 109 is the "target object" to be shot.

For the First Object 108:

The present disclosure does not limit display parameters such as display brightness, size, color, saturation, and effect of the first object 108. For example, when the first object 108 is the bow and arrow, a "bow" portion may be in gold color, a body portion of the "arrow" may also be in the same gold color as the "bow", and an arrow head portion of the "arrow" may be in a red heart shape. Certainly, the first object 108 may also adopt other display styles, for example, the arrow head portion may adopt shapes of "star", "airplane", "flower" and the like.

For the Second Object 109:

The second object 109 is a target object to be shot by the first object 108. The present disclosure does not limit parameters such as whether the second object 109 has the effect, and display parameters such as color, saturation, size, and brightness of the second object 109.

In some possible implementations, a display position of the second object 109 on the mobile phone screen is associated with a position of a preset target object in the multimedia content, and the display position of the second object 109 is changed with the position of the preset target object. The preset target object may be any types of objects, and the present disclosure does not limit the preset target object. For example, the preset target object may be a specific portion of a character in the playing picture of the multimedia content, such as a face, an eye, a head, an ear, and a hand.

It is assumed that the preset target object is the head of the character, the first object 108 is the bow and arrow, and the arrow head portion is in the heart shape, and the second object 109 is in the heart shape corresponding to the arrow head portion. As shown in FIG. 1D, when APP1 identifies that the head of the character is included in the playing picture of the multimedia content, the second object 109 is displayed in the position of the head of the character. Because the preset target object may move in the process of playing the multimedia content, the display position of the second object 109 may move with the preset target object.

When the preset target object is other, the display mode is similar. For simplicity, it is not repeatedly described here.

In other possible implementations, the display position of the second object 109 on the mobile phone screen is independent of the position of the preset target object in the multimedia content, namely the second object 109 may be displayed in any positions on the mobile phone screen. For example, when the user triggers the target virtual resource, the second object 109 may be displayed in a preset position. The second object 109 may be fixedly displayed in the preset position, or may be continuously changed between a plurality of the preset positions according to a preset mode.

For the First Control 110:

The first control 110 is used to control the first object 108 to shoot or continuously shoot the second object 109. The first control 110 may be realized by one or more modes such as a text, an image, and a symbol. For example, as shown in FIG. 1D, the first control 110 is a circular button, and a text content of "long press and continuous shooting" is displayed in the circular button.

In addition, the present disclosure does not limit display parameters such as color, saturation, size, and brightness of the first control 110. In addition, the display style of the circular button corresponding to the first control 110 may be continuously changed with the continuous shootings number and the time of the continuous shootings. For example, the circular button of the first control 110 includes fan-shaped areas corresponding to two colors respectively. As the continuous shootings number and the time of the continuous shootings are increased continuously, the area of the fan-shaped area corresponding to the color 1 is increased continuously, and the area of the fan-shaped area corresponding to the color 2 is decreased continuously. When the time of the continuous shootings reaches a preset time, all areas corresponding to the circular button of the first control 110 are the color 1.

It should be noted that the preset time may be flexibly set, for example, the preset time may be 30 seconds, 1 minute, 2 minutes, and 3 minutes, and the preset time may also be infinite.

In some possible implementations, in response to the triggering operation for the target virtual resource, APP1 may also display a timer 111, the timer 111 is used to time, and a timing result is used to control the end of the first object shooting the second object. The timer 111 may be timed by using "second" as a time unit. The timer 111 may use a countdown mode or a sequential timing mode, and it is not limited in the present disclosure.

In addition, the present disclosure does not limit parameters such as display style, display position, size, and color of the corresponding timer 111. Exemplarily, the timer 111 may adopt a more concise circular style, a square style, an elliptical style, or a complex timer style or the like. FIG. 1D exemplarily shows that the timer 111 adopts the more concise circular style, and the timer adopts the countdown mode, the number displayed currently is "60". For example, the timer 111 may be displayed in an upper position, a left position or a right position or the like of the first control 110 included in the target virtual resource.

In some possible implementations, APP1 may display the timer 111 in the area corresponding to the first control 110 when the triggering operation for the first control 110 is received. The embodiment shown in FIG. 1D is taken as an example, the first control 110 is the circular button, and the text content of "long press and continuous shooting" is displayed in the area corresponding to the circular button. When APP1 receives the triggering operation for the first control 110, the text content of "long press and continuous shooting" in the circular area corresponding to the first control 110 disappears, and APP1 displays the timing result corresponding to the timer 111 in the area of the circular button corresponding to the first control 110 (such as seconds of the sequential timing or seconds of the countdown).

In the embodiments shown in the present disclosure, the first object 108 may be targeted at the second object 109 by default, and the user does not need to adjust a shooting direction of the first object 108, user operations are reduced, and it is beneficial to improve the user experience.

APP1 receives the triggering operation (such as a continuous clicking operation or a long-pressing operation) for the first control 110, and APP1 may control the first object 109 to shoot the second object 110 in a current direction. Exemplarily, APP1 exemplarily displays the user interface 15 shown in FIG. 1E on the mobile phone.

The user interface 15 includes: an area 112, the area 112 is used to display a scoring panel, and the scoring panel is mainly used to display the continuous shootings number by the user. The present disclosure does not limit the display mode of the scoring panel. The scoring panel may be displayed in the form of a combination of an image and a number. For example, in the embodiment shown in FIG. 1E, the scoring panel in the area 112 is a rounded rectangle, and a left side and a right side of the rounded rectangle have wing-shaped patterns respectively. In the interior of the rounded rectangle, the number of the continuously shootings of the first object 108 continuously shooting the second object 109 may be displayed.

Figure 1E:
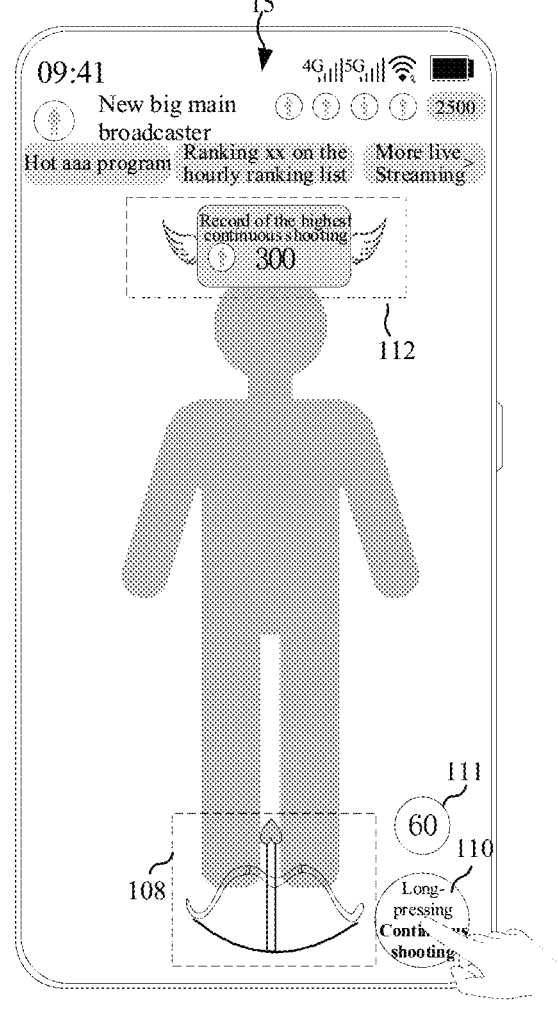

In the embodiment shown in FIG. 1E, when APP1 displays the area 112, the second object 109 may disappear, namely when the user starts the continuous shooting, the second object 109 is not displayed. This may allow the user's attention to focus on the continuous shootings number, as to improve the user's enthusiasm for competition with the user who currently has the highest continuous shootings number, and thereby the diversity of interaction is improved.

Figure 1F:
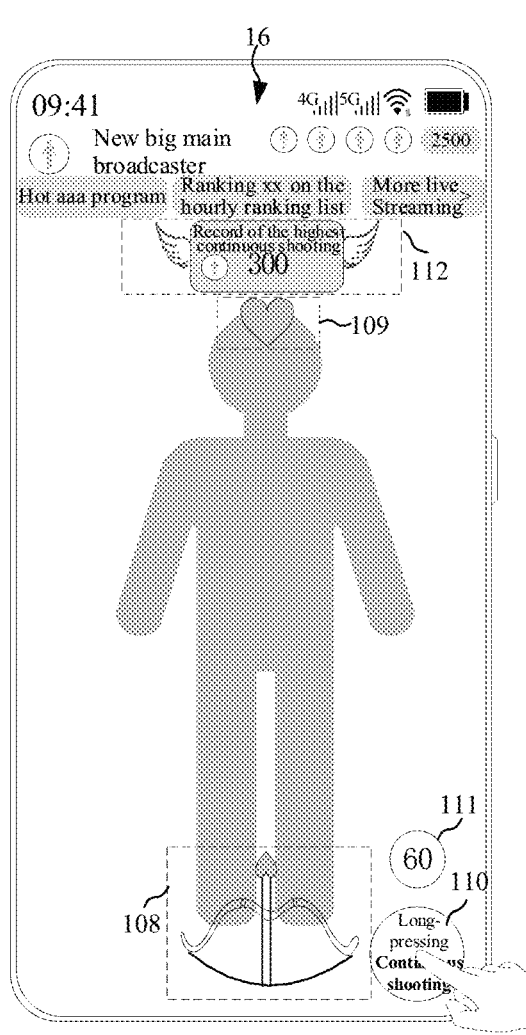

It should be understood that when the first object 108 starts shooting the second object 109 continuously, the second object 109 may always be displayed in the user interface. For example, referring to the embodiment shown in FIG. 1F, the area 112 may be displayed above the second object 109, and the area 112 does not block the second object 109. Certainly, the area 112 may also be displayed in other positions in the user interface, and the mode shown in FIG. 1F is only an example.

The embodiment shown in FIG. 1E is taken as an example, in some cases, in the process of playing the multimedia content, there may be a user who sends the target virtual resource to the object in the multimedia content. Therefore, the target virtual resource corresponds to a record of the continuous shootings, so associated information about the highest continuous shootings number may be displayed before shooting.

It should be noted that if there is no user who uses the target virtual resource in the process of the playing the multimedia content, the highest continuous shootings number corresponding to the target virtual resource is equivalent to 0, and a prompt text content may be displayed, such as "creating a continuous shooting record quickly". Certainly, any associated information may also not be displayed.

Exemplarily, in the process of the first object 108 shooting the second object 109 for the first time, the scoring panel in the area 112 may display the associated information about the highest continuous shootings number corresponding to the target virtual resource from the starting point of the first object 108 to the moment before hitting the second object 109. When the first object 108 hits the second object 109 for the first time, the scoring panel displays the continuous shootings number as 1, and as the continuous shootings number of the first object 108 shooting the second object 109 is increased continuously, the continuous shootings number displayed on the scoring panel is changed continuously.

APP1 displays the highest continuous shootings number corresponding to the target virtual resource on the scoring panel before the first object 108 hits the second object 109 for the first time, so that the user who sends the target virtual resource currently may know the information of the current highest number of the continuous shootings, and it is beneficial for improving the competition enthusiasm between the current user and the user who has the highest continuous shootings number, thereby the diversity of interaction is improved.

When the triggering operation for the first control 110 is a continuous clicking operation, the continuous shootings number displayed in the scoring panel is consistent with the number of the continuous clicking operations; and it is assumed that the user inputs 5 clicking operations for the first control 110 continuously, the scoring panel may display the continuous shootings number as 5.

When the triggering operation for the first control 110 is a long-pressing operation, APP1 may launch the first object 108 at a preset time interval, and the continuous shootings number displayed on the scoring panel is related to a duration of the long-pressing operation;

and it is assumed that the user long-presses the first control 110 for 5 seconds continuously, APP1 launches the first object 108 every 0.5 seconds, and when the long-pressing operation ends, the scoring panel may display the continuous shootings number as 13. The continuous shootings number displayed in the scoring panel is 6 because the first object 108 is launched to shoot the second object 109 once every 0.5 seconds. Within 5 seconds of the duration, the first object 108 shoots the second object 109 for 13 times, and at the end of the long-pressing operation, the shooting result of the first object 108 shooting the second object 109 is also counted. Certainly, the shooting result of the first object 108 shooting the second object 109 at the end of the long-pressing operation may also not be counted.

In addition, the display style of the scoring panel in the area 112 may be changed as the continuous shootings number is increased continuously. The display style includes but not limited to: shape, size, color, number and the like. For example, as the continuous shootings number is increased continuously, the size of the scoring panel may become larger and larger, the color is brighter and brighter, the font size of the numbers displayed on the scoring panel is larger and larger, and the color of the numbers may also be changed.

Figure 1G:
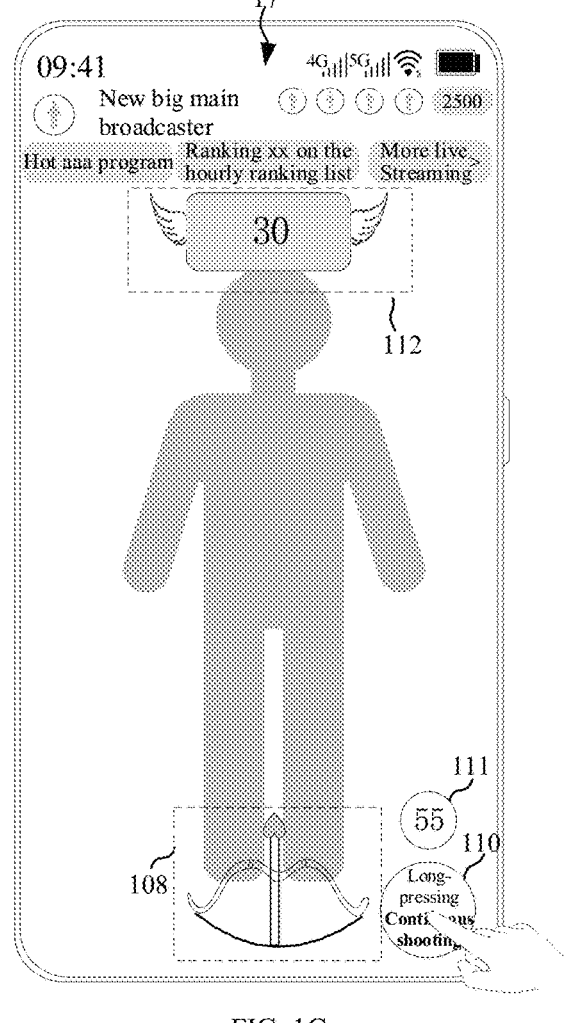

It is assumed that the user long-presses the first control 110, and the first object 108 continuously shoots the second object 109 for 30 times, APP1 displays the user interface 17 shown in FIG. 1G on the mobile phone. The scoring panel in the area 112 shown in the user interface 17 is compared with the scoring panel in the area 112 shown in the user interface 15, the size of the scoring panel in the area 112 in the user interface 17 is larger, and the numbers displayed in the scoring panel are also larger.

Figure 1H:
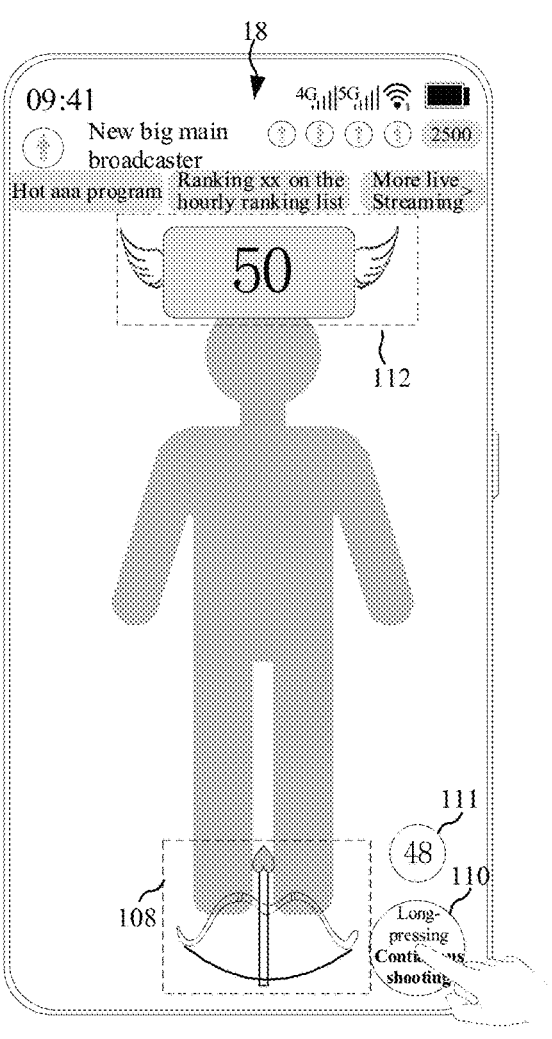

As the time for the user to long-press the first control 110 is increased continuously, when the first object 108 continuously shoots the second object 109 for 50 times, APP1 displays the user interface 18 shown in FIG. 1H on the mobile phone. The scoring panel in the area 112 shown in the user interface 18 is compared with the area 112 shown in the user interface 17, the size of the scoring panel in the area 112 in the user interface 18 is larger, and the numbers displayed in the scoring panel are also larger.

In combination with the embodiments shown in FIG. 1E, FIG. 1G, and FIG. 1H, the display style of the scoring panel displayed in the area 112 may be changed continuously with the increase of the continuous shootings number, as to improve the user experience in the continuous shooting process.

The embodiment shown in FIG. 1H is taken as an example, when the user triggers the first control 110 to control the first object 108 to shoot the second object 109, and APP1 detects the end of continuous shooting, APP1 determines whether the current user adjusts successfully according to the continuous shootings number of the current user and the highest continuous shootings number corresponding to the target virtual resource, and then plays the corresponding target effect.

APP 1 plays the corresponding target effect according to the continuous shootings number of the current user and the highest continuous shootings number corresponding to the target virtual resource, which may be divided into two situations: successful challenge and unsuccessful challenge:

(1) Successful Challenge

Specifically, if the continuous shootings number of the current user is greater than the highest continuous shootings number corresponding to the target virtual resource, it is indicated that the current user challenges successfully. APP1 may display a user interface of successful challenge on the mobile phone and display a target effect corresponding to the successful challenge in the user interface.

The present disclosure does not limit the realization mode of the target effect. For example, the target effect may be realized by a text, a static or dynamic image, an icon, a static or dynamic sticker, a sound, a vibration and the like.

In a possible implementation, APP1 may display the target effect of the successful challenge of the current user in the area 112. In addition, associated information such as a head portrait and a nickname of the current user may also be displayed in the area 112.

Figure 1I:
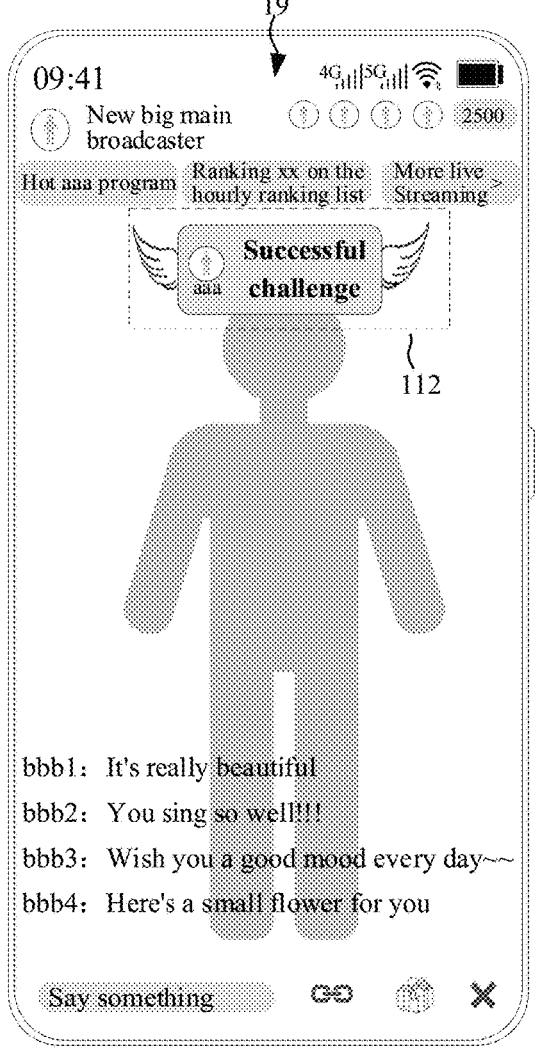

Exemplarily, the realization of the target effect by the text is taken as an example, APP1 may display the user interface 19 shown in FIG. 1I on the mobile phone. In FIG. 1I, the scoring panel displayed in the area 112 of the user interface 19 may display a text content of "successful challenge", and the head portrait of the current user and the nickname "aaa" of the current user are displayed in the scoring panel.

The present disclosure does not limit the text content displayed in the area 112 to indicate the successful challenge of the current user, and does not limit display parameters such as font size, color, and font of the text content. In addition, the present disclosure does not limit the display mode of the associated information such as the head portrait and nickname of the current user in the area 112. For example, the mode shown in FIG. 1I may be referred, the head portrait of the current user is displayed inside the scoring panel, and the nickname "aaa" of the current user is displayed below the head portrait of the current user. Alternatively, the user interface 20 shown in FIG. 1J may also be referred, the continuous shootings number of the current user is displayed in the scoring panel, the head portrait and nickname of the current user are displayed above the scoring panel, and an area displaying the head portrait of the current user is partially overlapped with the scoring panel.

Figure 1J:
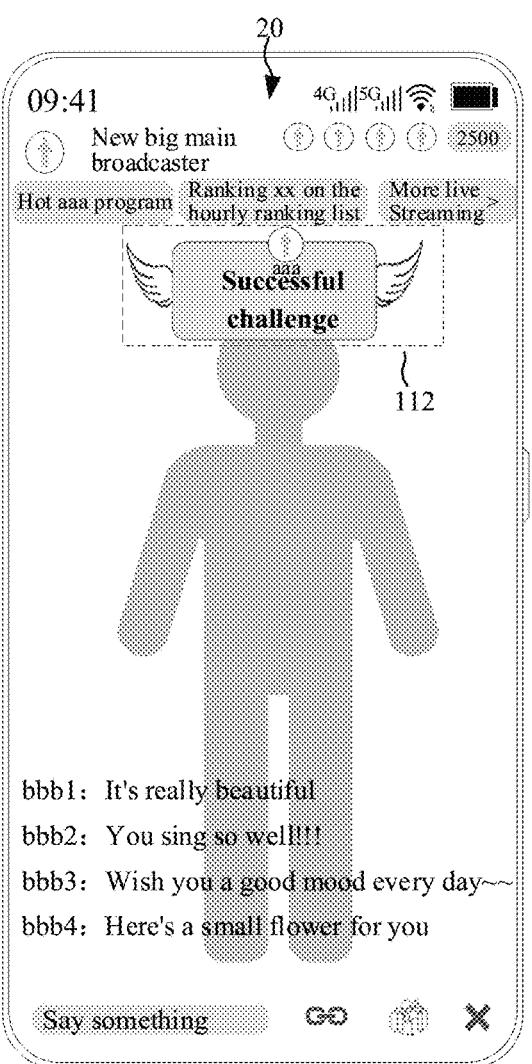

In combination with the embodiments shown in FIG. 1I and FIG. 1J, it may be seen that the target effect for the successful challenge of the current user is realized by the area 112 and the scoring panel in the area 112.

In another possible implementation, APP1 may display the target effect of the successful challenge of the current user by a specific area.

Figure 1K:
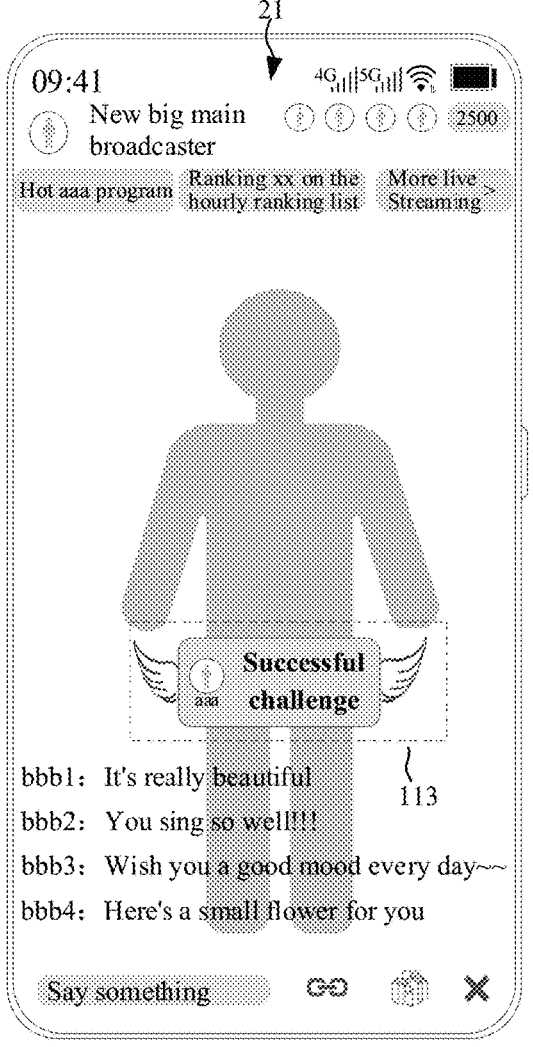

Exemplarily, the realization of the target effect by the text is taken as an example, APP1 may display the user interface 21 shown in FIG. 1K on the mobile phone. In FIG. 1K, the user interface 21 includes: an area 113, the area 113 is the specific area used to display the target effect. Namely, the text content of "successful challenge" may be displayed in the area 113, and the head portrait of the current user and the nickname "aaa" of the current user are displayed in the area 113.

The present disclosure does not limit the text content displayed in the area 113 to indicate the successful challenge of the current user, and does not limit the display parameters such as font size, color, and font of the text content. In addition, the present disclosure does not limit the display mode of associated information such as the head portrait and nickname of the current user in the area 113, and FIG. 1K is only an example.

It should be noted that in practical applications, the target effect may also be displayed in other modes, and it is not limited to the modes in the embodiments shown in FIG. 1I to FIG. 1K.

(2) Unsuccessful Challenge

If the continuous shootings number of the current user is less than or equal to the highest continuous shootings number corresponding to the target virtual resource, it is indicated that the current user challenges unsuccessfully. APP1 may display a user interface of unsuccessful challenge on the mobile phone and display a target effect corresponding to the unsuccessful challenge in the user interface.

The present disclosure does not limit the realization mode of the target effect corresponding to the unsuccessful challenge. For example, the target effect may be realized by a text, a static or dynamic image, an icon, a static or dynamic sticker, a sound, a vibration and the like.

In a possible implementation, APP1 may display the target effect of the unsuccessful challenge of the current user in the area 112. In addition, associated information such as a head portrait and a nickname of the current user may also be displayed in the area 112.

Figure 1L:
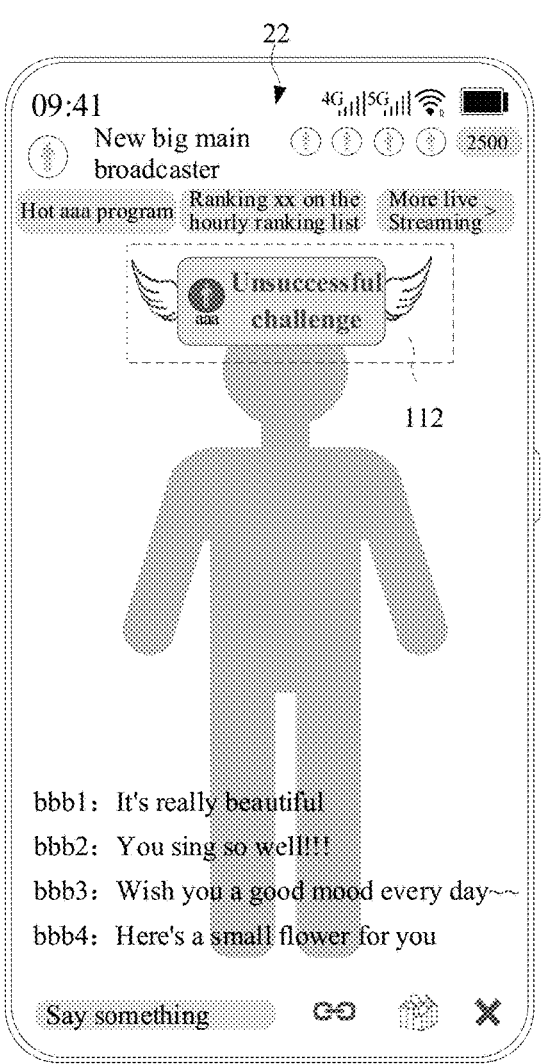

Exemplarily, the realization of the target effect by the text is taken as an example, APP1 may display the user interface 22 shown in FIG. 1L on the mobile phone. In FIG. 1L, the scoring panel displayed in the area 112 of the user interface 22 may display a text content of "unsuccessful challenge", and the color of the scoring panel may be set to gray, as to present an atmosphere of the unsuccessful challenge. In addition, the head portrait of the current user and the nickname "aaa" of the current user may also be displayed in the scoring panel, and the head portrait of the current user may also be set to gray, as to present the atmosphere of the unsuccessful challenge.

The present disclosure does not limit the text content displayed in the area 112 to indicate the unsuccessful challenge of the current user, and does not limit display parameters such as font size, color, and font of the text content. In addition, the present disclosure does not limit the display mode of the associated information such as the head portrait and nickname of the current user in the area 112. For example, the mode shown in FIG. 1L may be referred, the head portrait of the current user is displayed inside the scoring panel, and the nickname "aaa" of the current user is displayed below the head portrait of the current user. Alternatively, the continuous shootings number of the current user may also be displayed in the scoring panel, the head portrait and nickname of the current user are displayed above the scoring panel, and an area displaying the head portrait of the current user is partially overlapped with the scoring panel, which is similar to the embodiment shown in FIG. 1J above.

Referring to the embodiment shown in FIG. 1K, it may be seen that the target effect for the unsuccessful challenge of the current user is realized by the area 112 and the scoring panel in the area 112.

In another possible implementation, APP1 may display the target effect of the unsuccessful challenge of the current user by a specific area.

Figure 1M:
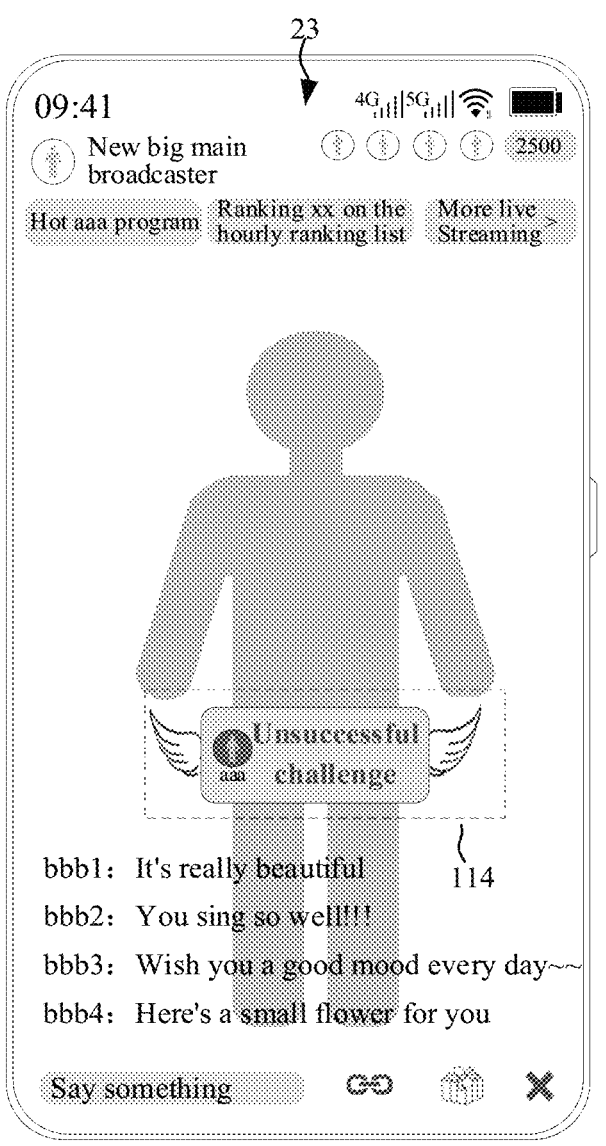

Exemplarily, the realization of the target effect by the text is taken as an example, APP1 may display the user interface 23 shown in FIG. 1M on the mobile phone. In FIG. 1M, the user interface 23 includes: an area 114, the area 114 is the specific area used to display the target effect corresponding to the unsuccessful challenge. Namely, the text content of "unsuccessful challenge" may be displayed in the area 114, the color of the text may be set to gray, as to present the atmosphere of the unsuccessful challenge. In addition, the head portrait of the current user and the nickname "aaa" of the current user may also be displayed in the area 114, and the head portrait of the current user may also be set to gray, as to present the atmosphere of the unsuccessful challenge.

The present disclosure does not limit the text content displayed in the area 114 to indicate the unsuccessful challenge of the current user, and does not limit the display parameters such as font size, color, and font of the text content. In addition, the present disclosure does not limit the display mode of associated information such as the head portrait and nickname of the current user in the area 114, and FIG. 1M is only an example.

It should be noted that in practical applications, the target effect may also be displayed in other modes, and it is not limited to the modes in the embodiments shown in FIG. 1L and FIG. 1M.

In conclusion, the embodiments shown in FIG. 1A to FIG. 1M may be schematic diagrams of human-computer interfaces of a resource giving client, and the realization modes of the interface schematic diagram are not limited to the examples shown in FIG. 1A to FIG. 1M above.

In the process of playing the multimedia content, it also includes other clients associated with the multimedia content, the clients associated with the multimedia content include, for example, a client publishing the multimedia content and other clients viewing the multimedia content. Therefore, it is also necessary to update the user interface of the client associated with the multimedia content according to the target virtual resource sent by the resource giving client and the continuous shootings number.

When the client associated with the multimedia content displays the target virtual resource, the interface changes are similar to the realization modes of the embodiments shown in FIG. 1E to FIG. 1M, and the detailed descriptions of the embodiments shown in FIG. 1E to FIG. 1M may be referred.

The client publishing the multimedia content is taken as an example, it is assumed that the user 1 sends the target virtual resource, the target virtual resource sent by the user 1 may preempt a playing position of the next virtual resource to be displayed on the client publishing the multimedia content, as to priority-play the target virtual resource sent by the user 1. By the way of examples, the target virtual resource preempting the playing position may be realized in two ways as described below:

In a possible implementation, the virtual resource to be played on the client publishing the multimedia content is stored in a queue according to a sequential order of a sending time by the resource giving client. When the user 1 sends the target virtual resource, the target virtual resource may be arranged in a foremost position of the queue, so that a resource channel playing the virtual resource may priority-display the target virtual resource.

In another possible implementation, the virtual resource to be played on the client publishing the multimedia content is stored in a queue according to a sequential order of a sending time by the resource giving client, and the virtual resource in the queue uses a resource channel 1; and when the user 1 sends the target virtual resource, a new resource channel is created, namely a resource channel 2, the resource channel 2 is used to display the target virtual resource, the virtual resource displayed by the resource channel 1 does not conflict with the target virtual resource displayed by the resource channel 2 mutually, as to implement the priority display of the target virtual resource.

The modes by which other clients viewing the multimedia content display the virtual resource are similar to the realization mode by which the client publishing the multimedia content displays the virtual resource. For simplicity, it is not repeatedly described here.

An embodiment of the present disclosure further provides an interaction method.

FIG. 2A is a flowchart of an interaction method provided by an embodiment of the present disclosure. As shown in FIG. 2A, the interaction method provided in this embodiment includes:

S101, in a process of playing a multimedia content, in response to a first operation, displaying a first control, a first object and a second object;

S102, in response to a second operation for the first control, controlling the first object to act on the second object, and displaying a panel, in which the panel is configured to display first action information of the first object acting on the second object;

and S103, when detecting an end of a process of the first object acting on the second object, playing a target effect according to the first action information of the first object acting on the second object.

For example, the first operation may be a triggering operation for a target virtual resource identifier (or icon), and the target virtual resource identifier is an identifier corresponding to a target virtual resource.

For example, the multimedia content includes livestreaming content, and responding to the first operation includes responding to an operation of sending a target virtual resource to a live streamer of a livestreaming room (or livestreaming channel).

In an embodiment, the controlling the first object to act on the second object includes at least one of: (i) controlling the first object to directly act on the second object; (ii) controlling an associated object of the first object to act on the second object.

In an embodiment, the first operation is a triggering operation for an identifier corresponding to a target virtual resource, and the target virtual resource includes the first object and the second object; the playing the target effect according to the first action information of the first object acting on the second object, includes: playing the target effect according to the first action information of the first object acting on the second object, and second action information corresponding to the target virtual resource; the first action information includes the number of actions of the first object acting on the second object, and the second action information includes the maximum number of actions corresponding to the target virtual resource.

In an embodiment, the playing the target effect according to the first action information of the first object acting on the second object, and the second action information corresponding to the target virtual resource, includes: if the number of actions of the first object acting on the second object is greater than the maximum number of actions corresponding to the target virtual resource, playing a first effect; and if the number of actions of the first object acting on the second object is less than or equal to the maximum number of actions corresponding to the target virtual resource, playing a second effect, the target effect is the first effect or the second effect.

In an embodiment, the method further includes: if the number of actions of the first object acting on the second object is greater than the maximum number of actions corresponding to the target virtual resource, displaying associated information of the target virtual resource. For example, the associated information of the target virtual resource includes associated information of a user operating the target virtual resource.

In an embodiment, the method further includes: if the number of actions of the first object acting on the second object is greater than the maximum number of actions corresponding to the target virtual resource, updating the maximum number of actions corresponding to the target virtual resource according to the number of actions of the first object acting on the second object.

In an embodiment, the target virtual resource includes a target virtual gift; the controlling the first object to act on the second object includes controlling the first object to shoot the second object; and the first action information is a number of shots of the first object shooting the second object, and the second action information is a maximum number of shots corresponding to the target virtual gift.

In an embodiment, the method further includes: in the process of the first object acting on the second object, dynamically updating a display style of the panel according to an increase of the number of actions of the first object acting on the second object.

In an embodiment, the detecting the end of the process of the first object acting on the second object includes not receiving the second operation again for the first control within a preset duration after receiving the second operation for the first control; or the target virtual resource is set with a usage duration, and the detecting the end of the process of the first object acting on the second object includes reaching the usage duration.

FIG. 2B is a flowchart of an interaction method provided by an embodiment of the present disclosure. As shown in FIG. 2B, the interaction method provided in this embodiment includes:

S201, in the process of playing a multimedia content, in response to a triggering operation for a target virtual resource, displaying a first control, and a first object and a second object included in the target virtual resource, the first control being configured to control the first object to continuously shoot the second object.

An application program is installed on an electronic device, and after the application program is started, the multimedia content in the application program may be played. The present disclosure does not limit the specific type of the application program or the specific type and content of the multimedia content.

In the process of playing the multimedia content in the application program, the electronic device may receive the triggering operation (such as a clicking operation) for the target virtual resource. In response to this triggering operation, the application program displays the first object and the second object included in the target virtual resource triggered on the electronic device, and the first control that controls the first object to continuously shoot the second object.

The present disclosure does not limit realization mode, display size, style, quantity, position, effect, and other display parameters of the first object, the second object, and the first control. For example, the detailed introduction of the first object, the second object, and the first control may refer to the description of the embodiments shown in FIG. 1A to FIG. 1H above, and it is not repeatedly described here.

It should be emphasized that the display position of the second object may be associated with the display position of the preset target object in the multimedia content. For example, in the embodiment shown in FIG. 1D, the second object is displayed in the position of the head of the character. Certainly, the display position of the second object may also be independent of the multimedia content. The second object may be fixedly displayed in a preset position or constantly changed between a plurality of the preset positions according to a preset mode.

S202, in response to a triggering operation for the first control, controlling the first object to continuously shoot the second object, and displaying a scoring panel, the scoring panel being configured to display the number of continuous shootings.

The triggering operation for the first control may be a long-pressing operation, and the application program may launch the first object at a preset time interval, and control the change of the numbers displayed in the scoring panel according to the number of the preset time intervals.

If the triggering operation for the first control is a continuous clicking operation, the application program may make the first object shoot the second object once every time it receives a clicking operation according to the continuous clicking operation, and when one clicking operation is received every time, the application program controls the number displayed in the scoring panel to increase by one.

Certainly, the triggering operation for the first control may also be combined with the aforementioned two situations, namely the triggering operation for the first control includes: the long-pressing operation and the continuous clicking operation. For example, the user may firstly input the long-pressing operation, and then input the continuous clicking operation; alternatively, the user may firstly input the continuous clicking operation, and then input the long-pressing operation.

In addition, in the process of the first object continuously shooting the second object, the display style of the scoring panel may also be changed with the continuous increase of the continuous shootings number, and the display style of the scoring panel includes but not limited to: shape, size, color, number displayed in the scoring panel, and the like. For example, in the embodiments shown in FIG. 1E, FIG. 1G, and FIG. 1H, the size of the scoring panel may be continuously increased with the continuous increase of the continuous shootings number. For details, the detailed descriptions of the embodiments shown in FIG. 1E, FIG. 1G, and FIG. 1H may be referred. For simplicity, it is not repeatedly described here.

S203, when detecting the end of the continuous shootings, playing a target effect according to the continuous shootings number and the highest continuous shootings number corresponding to the target virtual resource.

The application program may detect the end of the continuous shootings by the following modes, but not limited to:

(1) If the application program does not receive the triggering operation again for the first control within the preset duration after the triggering operation for the first control is received, it is determined that the continuous shootings end; and (2) if the target virtual resource is set with a usage duration, when the usage duration is reached, it is determined that the continuous shootings end.

When the application program detects the end of the continuous shooting, it may play the corresponding target effect according to the continuous shootings number and the highest continuous shootings number of the target virtual resource sent in the process of playing the multimedia content.

Specifically, if the continuous shootings number is greater than the highest continuous shootings number corresponding to the target virtual resource, it is indicated that the current user challenges successfully, and the application program may display a first effect. The first effect may be realized by one or more modes of a text, a static or dynamic image, an icon, a static or dynamic sticker, a sound, a vibration and the like, and it is not limited in the present disclosure. In addition, the different first effects may also be played according to the degree to which the current continuous shootings number exceeds the highest continuous shootings number.

In addition, if the continuous shootings number is greater than the highest continuous shootings number, the application program may also display associated information about the user who sends the target virtual resource currently, such as the head portrait, nickname, and other information of the user who sends the target virtual resource currently. The head portrait of the user who sends the target virtual resource currently may also lead to the homepage of the user, for example, the embodiments shown in FIG. 1I to FIG. 1K above.

If the continuous shootings number is less than or equal to the highest continuous shootings number corresponding to the target virtual resource, it is indicated that the current user challenges unsuccessfully, and the application program may display a second effect. The second effect may be realized by one or more modes of a text, a static or dynamic image, an icon, a static or dynamic sticker, a sound, a vibration and the like, and it is not limited in the present disclosure. In addition, the different second effects may also be played according to the degree to which the current continuous shootings number is less than the highest continuous shootings number, for example, the embodiments shown in FIG. 1L to FIG. 1M above.

The detailed descriptions of two situations of "successful challenge" and "unsuccessful challenge" in the aforementioned embodiments may be combined for simplicity, and it is not repeatedly described here.

Based on the method provided in this embodiment, in the process of playing the multimedia content, in response to the triggering operation for the target virtual resource, the first control and the first object and the second object included in the target virtual resource are displayed, the first control is configured to control the first object to continuously shoot the second object; in response to the triggering operation for the first control, the first object is controlled to continuously shoot the second object, and the scoring panel for displaying the continuous shootings number is displayed; and when detecting the end of the continuous shootings, the target effect is played according to the continuous shootings number and the highest continuous shootings number corresponding to the target virtual resource. By transparently transmitting the competition result of the user using the target virtual resource, the healthy competition between the user and the user with the highest continuous shootings number is established, thereby the diversity of interaction between the user and the object in the multimedia content is enhanced, and it is beneficial to increase the users' enthusiasm for using the target virtual resource.

FIG. 3 is a flowchart of an interaction method provided by another embodiment of the present disclosure. As shown in FIG. 3, the method provided in this embodiment is based on the embodiment shown in FIG. 2B, and after S203, it further includes:

S204, if the continuous shootings number is greater than the highest continuous shootings number, updating the highest continuous shootings number according to the continuous shootings number.

The electronic device may send the continuous shootings number to a server device, and the server device may compare the continuous shootings number received with the highest continuous shootings number. When it is determined that the continuous shootings number received is greater than the highest continuous shootings number, the continuous shootings number received is updated to the highest continuous shootings number.

Based on the method provided in this embodiment, in the process of playing the multimedia content, in response to the triggering operation for the target virtual resource, the first control and the first object and the second object included in the target virtual resource are displayed, the first control being configured to control the first object to continuously shoot the second object; in response to the triggering operation for the first control, the first object is controlled to continuously shoot the second object, and the scoring panel for displaying the continuous shootings number is displayed; and when detecting the end of the continuous shootings, the target effect is played according to the continuous shootings number and the highest continuous shootings number corresponding to the target virtual resource. By transparently transmitting the competition result of the user using the target virtual resource, the healthy competition between the user and the user with the highest continuous shootings number is established, thereby the diversity of interaction between the user and the object in the multimedia content is enhanced, and it is beneficial to increase the users' enthusiasm for using the target virtual resource. In addition, when the continuous shootings number of the user using the target virtual resource exceeds the highest continuous shootings number, the highest continuous shootings number is updated to guarantee the accuracy of data.

FIG. 4 is a schematic diagram of an application scene of an interaction method provided by an embodiment of the present disclosure. The scene shown in FIG. 4 includes: a first client 401, at least one second client 402, and a server device 403, the first client 401 and at least one second client 402 may interact with the server device 403.

The first client 401 includes: a client sending a target virtual resource. At least one second client 402 may include: a client viewing a multimedia content and a client publishing the multimedia content.

In the process of viewing the multimedia content, the user 1 may input a triggering operation for the target virtual resource to the first client 401, the first client 401 may send associated information about the target virtual resource, associated information about the user 1, and associated information about the multimedia content viewed currently to the server device 403, the associated information about the target virtual resource may include a name of the target virtual resource, a numerical number of the target virtual resource and the like that may uniquely identify the target virtual resource; and the associated information about the user 1 may include a nickname of the user 1, account information of the user 1 and other information that may uniquely identify the user 1.

The server device 403 receives the associated information about the target virtual resource and the associated information about the user 1 sent by the first client 401, and adds the target virtual resource to a virtual resource queue, as to display the target virtual resource on the first client 401 and the client associated with the multimedia content viewed by the user 1 (namely the at least one second client 402).

The server device 403 may include: a center service and a effect software development kit (SDK).

The center service may provide some general capabilities, such as storing user data, and sending related data to clients; and the effect SDK is used to implement functions related to the effect and virtual resource.

When the center service included in the server device 403 receives the associated information about the target virtual resource and the associated information about the user 1 sent by the first client 401, data of the target virtual resource is obtained from the effect SDK according to the associated information about the target virtual resource; and the center service may display the target virtual resource on the first client 401 and the client associated with the multimedia content viewed by the user 1 (namely the at least one second client 402) according to the data of the target virtual resource.

The realization mode of displaying the target virtual resource on the first client 401 may refer to the embodiments shown in FIG. 1A to FIG. 1M above.

The center service may display the target virtual resource on the at least one second client 402 according to the data of the target virtual resource, which may be realized by the following modes:

A possible implementation is that the center service adds the target virtual resource to a foremost position of the current virtual resource queue, so that the center service may distribute the data of the target virtual resource to the above at least one second client 402 in the order of the virtual resource queue, as to priority-display the target virtual resource on each second client 402.

Another possible implementation is that the center service may recreate a virtual resource queue and add the data of the target virtual resource to the virtual resource queue recreated, and the center service may distribute the data of the target virtual resource to the above at least one second client 402 according to the virtual resource queue recreated, as to priority-display the target virtual resource on each second client 402.

It should be noted that if the display position of the second object included in the target virtual resource is associated with a preset target object in the multimedia content, it may be realized by the effect SDK. For example, SDK may identify the multimedia content, determine the position of the preset target object in a playing picture of the multimedia content, and transmit position information identified to the center service, so that the center service may control the display position of the second object included in the target virtual resource according to the identified position of the preset target object in the playing picture of the multimedia content.

In addition, the server device 403 may also determine the target effect according to whether the continuous shootings number of the user 1 sending the target virtual resource exceeds the highest continuous shootings number corresponding to the target virtual resource. For example, the center service may determine whether the continuous shootings number of the user 1 sending the target virtual resource exceeds the highest the continuous shootings number corresponding to the target virtual resource, and according to a result, obtain data of the target effect from the effect SDK, and transmit the data of the target effect to the at least one second client 402 associated with the multimedia content, as to display the target effect on the at least one second client 402.

In addition, the center service included in the server device 403 may also update the highest continuous shootings number corresponding to the target virtual resource when it is determined that the continuous shootings number of the user 1 sending the target virtual resource exceeds the highest continuous shootings number corresponding to the target virtual resource.

In a possible implementation, the first client 401 may obtain the highest continuous shootings number corresponding to the target virtual resource, if the continuous shootings number of the user 1 sending the target virtual resource exceeds the highest continuous shootings number, the highest continuous shootings number is updated, and the highest continuous shootings number updated may be sent to the server device 403, so that the server device 403 updates the highest continuous shootings number.

In another possible implementation, the first client 401 may send the continuous shootings number of the user 1 sending the target virtual resource to the server device 403, the server device 403 judges whether the continuous shootings number of the user 1 sending the target virtual resource exceeds the highest continuous shootings number, and updates the highest continuous shootings number.

By the scene shown in FIG. 4, in the process of playing the multimedia content, if a user sends a target virtual resource, a competition result of the user using the target virtual resource is transmitted transparently, to establish a healthy competition between the user and the user with the highest continuous shootings number, thereby the diversity of interaction between the user and the object in the multimedia content is enhanced, and it is beneficial to improve the user's enthusiasm for using the target virtual resource.

Exemplarily, the present disclosure further provides an interaction apparatus.

Figure 5:
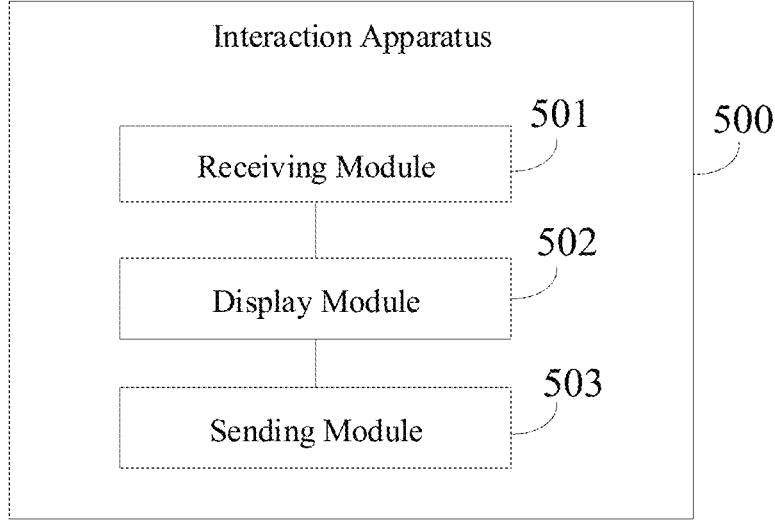
FIG. 5 is a structural schematic diagram of an interaction apparatus provided by an embodiment of the present disclosure.

FIG. 5 is a structural schematic diagram of an interaction apparatus provided in an embodiment of the present disclosure. As shown in FIG. 5, the interaction apparatus 500 provided in this embodiment includes: a receiving module 501, configured to receive a triggering operation for a target virtual resource; and a display module 502, configured to, in the process of playing a multimedia content, in response to the triggering operation for the target virtual resource, display a first control, and a first object and a second object included in the target virtual resource, the first control being configured to control the first object to continuously shoot the second object; the receiving module 501 is further configured to receive a triggering operation for the first control; the display module 502 is further configured to, in response to the triggering operation for the first control, display the first object continuously shooting the second object, and display a scoring panel, and the scoring panel is configured to display the continuous shootings number; and when detecting the end of the continuous shootings, play a target effect according to the continuous shootings number and the highest continuous shootings number corresponding to the target virtual resource.

In a possible implementation, if the continuous shootings number is greater than the highest continuous shootings number corresponding to the target virtual resource, the display module 502 is configured to play a first effect; and if the continuous shootings number is less than or equal to the highest continuous shootings number corresponding to the target virtual resource, the display module 502 is configured to play a second effect; the target effect being the first effect or the second effect.

In a possible implementation, in the case the continuous shootings number is greater than the highest continuous shootings number corresponding to the target virtual resource, the display module 502 is also configured to display associated information about the user operating the target virtual resource.

In a possible implementation, if the continuous shootings number is greater than the highest continuous shootings number, the highest continuous shootings number is updated according to the continuous shootings number.

In a possible implementation, in the process of the first object continuously shooting the second object, the display module 502 is also used to dynamically update the display style of the scoring panel according to the increase of the continuous shootings number.

In a possible implementation, in the case the playing picture of the multimedia content includes a preset target object, the display module 502 is specifically configured to display the second object according to the position of the preset target object in the playing picture.

In a possible implementation, in the case the playing picture of the multimedia content does not include the preset target object, the display module 502 is specifically configured to display the second object in the first preset position in the playing picture of the multimedia content.

In a possible implementation, the interaction apparatus 500 further includes: a sending module 504, configured to send the associated information about the target virtual resource to a server device to cause the server device to display the target virtual resource on the client associated with the multimedia content, according to the associated information about the target virtual resource.

The interaction apparatus provided in this embodiment may be used to implement the technical schemes of any one of the aforementioned method embodiments, and its realization principles and technical effects are similar, and may refer to the detailed description of the aforementioned method embodiments. For simplicity, it is not repeatedly described here.

Exemplarily, the present disclosure further provides an electronic device.

Figure 6:
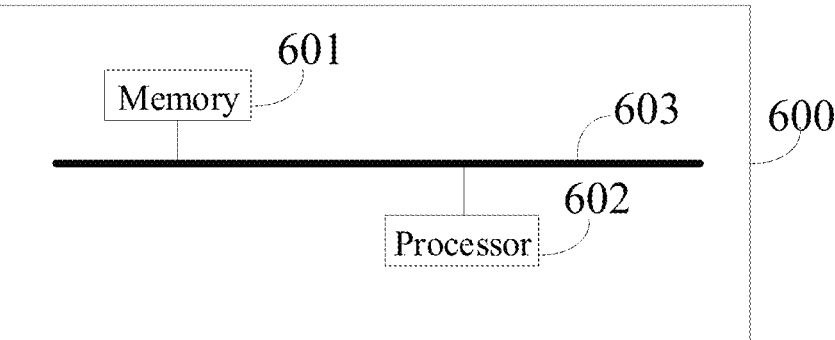
FIG. 6 is a structural schematic diagram of an electronic device provided by an embodiment of the present disclosure.

FIG. 6 is a structural schematic diagram of an electronic device provided in an embodiment of the present disclosure. As shown in FIG. 6, the electronic device 600 provided in this embodiment includes a memory 601 and a processor 602.

The memory 601 may be an independent physical unit and may be connected with the processor 602 by a bus 603. The memory 601 and the processor 602 may also be integrated together by hardware implementation and the like.

The memory 601 is used to store program instructions, and the processor 602 calls the program instructions to execute the interaction method provided by any one of the above method embodiments.

In some embodiments, when some or all of the methods in the above embodiments are realized by software, the above electronic device 600 may also only include a processor 602. The memory 601 for storing the program is located outside the electronic device 600, and the processor 602 is connected with the memory by a circuit/wire, and used to read and execute the program stored in the memory.

The processor 602 may be a central processing unit (CPU), a network processor (NP), or a combination of CPU and NP.

The processor 602 may further include a hardware chip. The above hardware chip may be an application-specific integrated circuit (ASIC), a programmable logic device (PLD), or a combination thereof. The above PLD may be a complex programmable logic device (CPLD), a field-programmable gate array (FPGA), a generic array logic (GAL), or any combinations thereof.

The memory 601 may include a volatile memory, such as a random-access memory (RAM); the memory may also include a non-volatile memory, such as a flash memory, a hard disk drive (HDD), or a solid-state drive (SSD); and the memory may also include a combination of the above types of the memories.

The present disclosure further provides a readable storage medium, which includes computer program instructions, when the computer program instructions are executed by at least one processor of an electronic device, the electronic device implements the interaction method provided in any one of the above method embodiments.

The present disclosure further provides a computer program product, when the computer program product is run on a computer, the computer program product implements the interaction method provided in any one of the above method embodiments.

It should be noted that, in the present disclosure, the relational terms such as "first", "second", and the like, are only used to distinguish one entity or operation from another entity or operation, and are not intended to require or imply the existence of any actual relationship or order between these entities or operations. Furthermore, the terms "comprise/comprising", "include/including", or any other variations thereof are intended to cover a non-exclusive inclusion such that a process, method, article, or device that includes a list of elements includes not only those elements, but also other elements not expressly listed, or elements inherent to the process, method, article, or device. Without further limitation, an element qualified by the statement "comprises/includes a . . . " does not exclude the presence of additional identical elements in the process, method, article, or device that includes the element.

What have been described above are only specific implementations of the present disclosure, enabling those skilled in the art to understand or implement the present disclosure. Various modifications to these embodiments are apparent to those skilled in the art, and the generic principles defined herein may be implemented in other embodiments without departing from the spirit or scope of the present disclosure. Therefore, the present disclosure is not to be limited to the embodiments herein but is intended to be accorded the widest scope consistent with the principles and novel features disclosed herein.

The invention claimed is:

1. An interaction method, applied to livestreaming and comprising:

in a process of playing a multimedia content in a livestreaming interface, receiving a first operation and in response to the first operation, displaying a first control, a first object and a second object;

receiving a second operation on the first control and in response to the second operation, controlling the first object to act on the second object, displaying first action information of the first object acting on the second object in a panel in real time when the first object is acting on the second object, and displaying a timer in the livestreaming interface, wherein a timing result of the timer is used to control an end of the first object acting on the second object;

changing the first action information accordingly as time that the first object acts on the second object increases;

dynamically changing a display style of the panel as the time that the first object acts on the second object increases; and when detecting an end of a process of the first object acting on the second object, playing a third effect according to the first action information of the first object acting on the second object;

wherein a display style of the first control is dynamically changed as the time that the first object acts on the second object increases.

2. The method according to claim 1, wherein the controlling the first object to act on the second object comprises at least one of:

(i) controlling the first object to directly act on the second object;

(ii) controlling an associated object of the first object to act on the second object.

3. The method according to claim 1, wherein the first operation is a triggering operation for an identifier corresponding to a virtual resource, and the virtual resource comprises the first object and the second object;

the playing the third effect according to the first action information of the first object acting on the second object, comprises:

playing the third effect according to the first action information of the first object acting on the second object and second action information corresponding to the virtual resource, wherein the first action information comprises a number of actions of the first object acting on the second object, and the second action information comprises a maximum number of actions corresponding to the virtual resource.

4. The method according to claim 3, wherein the playing the third effect according to the first action information of the first object acting on the second object and the second action information corresponding to the virtual resource, comprises:

determining that the number of actions of the first object acting on the second object is greater than the maximum number of actions corresponding to the virtual resource, playing a first effect;

wherein the third effect is the first effect.

5. The method according to claim 3, further comprising:

determining that the number of actions of the first object acting on the second object is greater than the maximum number of actions corresponding to the virtual resource, displaying associated information of the virtual resource.

6. The method according to claim 3, further comprising:

determining that the number of actions of the first object acting on the second object is greater than the maximum number of actions corresponding to the virtual resource, updating the maximum number of actions corresponding to the virtual resource according to the number of actions of the first object acting on the second object.

7. The method according to claim 3, wherein the virtual resource comprises a virtual gift;

the controlling the first object to act on the second object comprises controlling the first object to shoot the second object; and the first action information is a number of shots of the first object shooting the second object, and the second action information is a maximum number of shots corresponding to the virtual gift.

8. The method according to claim 3, wherein the dynamically changing a display style of the panel as the time that the first object acts on the second object increases comprises:

in the process of the first object acting on the second object, dynamically updating the display style of the panel according to an increase of the number of actions of the first object acting on the second object.

9. The method according to claim 3, wherein the playing the third effect according to the first action information of the first object acting on the second object and the second action information corresponding to the virtual resource, comprises:

determining that the number of actions of the first object acting on the second object is less than or equal to the maximum number of actions corresponding to the virtual resource, playing a second effect, wherein the third effect is the second effect.

10. The method according to claim 1, wherein displaying the first control, and the first object and the second object comprised in a virtual resource, comprises:

determining that a playing picture of the multimedia content comprises a preset object, displaying the second object according to a position of the preset object in the playing picture.

11. The method according to claim 1, wherein displaying the first control, and the first object and the second object comprised in a virtual resource, comprises:

determining that a playing picture of the multimedia content does not comprise a preset object, displaying the second object in a first preset position in the playing picture of the multimedia content.

12. The method according to claim 1, wherein the detecting the end of the process of the first object acting on the second object comprises not receiving the second operation again for the first control within a preset duration after receiving the second operation for the first control; or a virtual resource is set with a usage duration, and the detecting the end of the process of the first object acting on the second object comprises reaching the usage duration.

13. A non-transitory readable storage medium, comprising computer program instructions, wherein the computer program instructions are executed by at least one processor of an electronic device, causing the electronic device to implement the interaction method according to claim 1.

14. The method according to claim 1, further comprising:

sending associated information of a virtual resource to a server device to cause the server device to display the virtual resource on a client associated with the multimedia content, according to the associated information of the virtual resource.

15. An electronic device, comprising a memory and a processor, wherein the memory is configured to store computer program instructions; and the processor is configured to execute the computer program instructions to implement an interaction method, and the interaction method is applied to livestreaming and comprises:

in a process of playing a multimedia content in a livestreaming interface, receiving a first operation for a virtual resource and in response to the first operation, displaying a first control, a first object and a second object, wherein the first control is configured to control the first object to act on the second object;

receiving a second operation on the first control and in response to the second operation, controlling the first object to act on the second object, displaying first action information of the first object acting on the second object in a panel in real time when the first object is acting on the second object, and displaying a timer in the livestreaming interface, wherein a timing result of the timer is used to control an end of the first object acting on the second object;

changing the first action information accordingly as time that the first object acts on the second object increases;

dynamically changing a display style of the panel as the time that the first object acts on the second object increases; and when detecting an end of a process of the first object acting on the second object, playing a third effect according to the first action information of the first object acting on the second object;

wherein a display style of the first control is dynamically changed as the time that the first object acts on the second object increases.

16. The electronic device according to claim 15, wherein the controlling the first object to act on the second object comprises at least one of:

(i) controlling the first object to directly act on the second object;

(ii) controlling an associated object of the first object to act on the second object.

17. The electronic device according to claim 15, wherein the first operation is a triggering operation for an identifier corresponding to the virtual resource, and the virtual resource comprises the first object and the second object;

the playing the third effect according to the first action information of the first object acting on the second object, comprises:

playing the third effect according to the first action information of the first object acting on the second object and second action information corresponding to the virtual resource, wherein the first action information comprises a number of actions of the first object acting on the second object, and the second action information comprises a maximum number of actions corresponding to the virtual resource.

18. The electronic device according to claim 17, wherein the playing the third effect according to the first action information of the first object acting on the second object and the second action information corresponding to the virtual resource, comprises:

determining that the number of actions of the first object acting on the second object is greater than the maximum number of actions corresponding to the virtual resource, playing a first effect; or determining that the number of actions of the first object acting on the second object is less than or equal to the maximum number of actions corresponding to the virtual resource, playing a second effect, wherein the third effect is the first effect or the second effect.

19. The electronic device according to claim 17, wherein the interaction method further comprises:

determining that the number of actions of the first object acting on the second object is greater than the maximum number of actions corresponding to the virtual resource, displaying associated information of the virtual resource.

20. The electronic device according to claim 17, wherein the interaction method further comprises:

determining that the number of actions of the first object acting on the second object is greater than the maximum number of actions corresponding to the virtual resource, updating the maximum number of actions corresponding to the virtual resource according to the number of actions of the first object acting on the second object.

\* \* \* \* \*